(12) United States Patent
Kwon

(10) Patent No.: US 10,623,219 B2
(45) Date of Patent: Apr. 14, 2020

(54) MULTI-USER COMMUNICATION IN WIRELESS NETWORKS

(71) Applicant: NEWRACOM, INC., Lake Forest, CA (US)

(72) Inventor: Young Hoon Kwon, Laguna Niguel, CA (US)

(73) Assignee: NEWRACOM, INC., Lake Forest, CA (US)

( * ) Notice: Subject to any disclaimer, the term of this patent is extended or adjusted under 35 U.S.C. 154(b) by 0 days.

(21) Appl. No.: 16/288,030

(22) Filed: Feb. 27, 2019

(65) Prior Publication Data

US 2019/0199565 A1 Jun. 27, 2019

Related U.S. Application Data

(63) Continuation of application No. 15/705,047, filed on Sep. 14, 2017, now Pat. No. 10,257,003, and a continuation of application No. 15/136,845, filed on Apr. 22, 2016, now Pat. No. 9,794,098.

(60) Provisional application No. 62/214,867, filed on Sep. 4, 2015, provisional application No. 62/214,127, filed on Sep. 3, 2015, provisional application No. 62/181,141, filed on Jun. 17, 2015, provisional application No. 62/173,893, filed on Jun. 10, 2015, provisional application No. 62/152,497, filed on Apr. 24, 2015.

(51) Int. Cl.
*H04L 27/26* (2006.01)
*H04W 72/12* (2009.01)
*H04W 72/02* (2009.01)
*H04L 5/00* (2006.01)

(52) U.S. Cl.
CPC ........ *H04L 27/2601* (2013.01); *H04L 5/0044* (2013.01); *H04L 5/0053* (2013.01); *H04W 72/02* (2013.01); *H04W 72/1289* (2013.01); *H04W 72/121* (2013.01)

(58) Field of Classification Search
None
See application file for complete search history.

(56) References Cited

U.S. PATENT DOCUMENTS

2012/0026997 A1 2/2012 Seok et al.
2014/0050173 A1 2/2014 Yang et al.
(Continued)

OTHER PUBLICATIONS

Extended Search Report dated Nov. 27, 2018 for European Application No. 16784037.0.
(Continued)

*Primary Examiner* — Faruk Hamza
*Assistant Examiner* — Cassandra L Decker

(57) ABSTRACT

An Access Point (AP) performs a Multi-User (MU) transmission by allocating a plurality of resources of an Up-Link (UL) MU transmission to a first plurality of stations, and by transmitting, using one or more 20 MHz channels, a Down-Link (DL) PHY Layer Convergence Procedure (PLCP) Protocol Data Unit (PPDU). The DL PPDU includes trigger information. The trigger information solicits the first plurality of stations to participate in the UL MU transmission using the allocated resources. All of the allocated resources may be in the one or more 20 MHz channels of the DL PPDU. The allocated resources may include at least one resource in each of the one or more 20 MHz channels of the DL PPDU.

20 Claims, 12 Drawing Sheets

(56) References Cited

U.S. PATENT DOCUMENTS

| | | | |
|---|---|---|---|
| 2014/0105200 A1 | 4/2014 | Seok | |
| 2015/0063320 A1* | 3/2015 | Merlin et al. | |
| 2016/0338105 A1* | 11/2016 | Wu | H04W 74/0816 |
| 2017/0338931 A1* | 11/2017 | Kim | H04L 1/16 |
| 2018/0269940 A1* | 9/2018 | Vermani | H04B 7/0452 |

OTHER PUBLICATIONS

Search Report and Written Opinion dated Jul. 28, 2016 for PCT Application No. PCT/US2016/029062.
Part 11: Wireless LAN Medium Access Control (MAC) and Physical Layer (PHY) Specifications, IEEE Standards 802.11, (Revision of IEEE Standard 802.11-2007), Mar. 29, 2012, pp. 1-2695, 2695, IEEE (The Institute of Electrical and Electronic Engineers, Inc.), New York, NY, USA.
Part 11: Wireless LAN Medium Access Control (MAC) and Physical Layer (PHY) Specifications, Amendment 4: Enhancements for Very High Throughput for Operation in Bands below 6 GHz, IEEE Standards 802.11ac, 2013, pp. 1-395, IEEE (The Institute of Electrical and Electronic Engineers, Inc.), New York, NY, USA.
Part 11: Wireless LAN Medium Access Control (MAC) and Physical Layer (PHY) Specifications, Amendment 2: Sub 1 GHz License Exempt Operation, IEEE P802.11ah/D5.0, Mar. 2015, pp. 1-604, IEEE (The Institute of Electrical and Electronic Engineers, Inc.), New York, NY, USA.

* cited by examiner

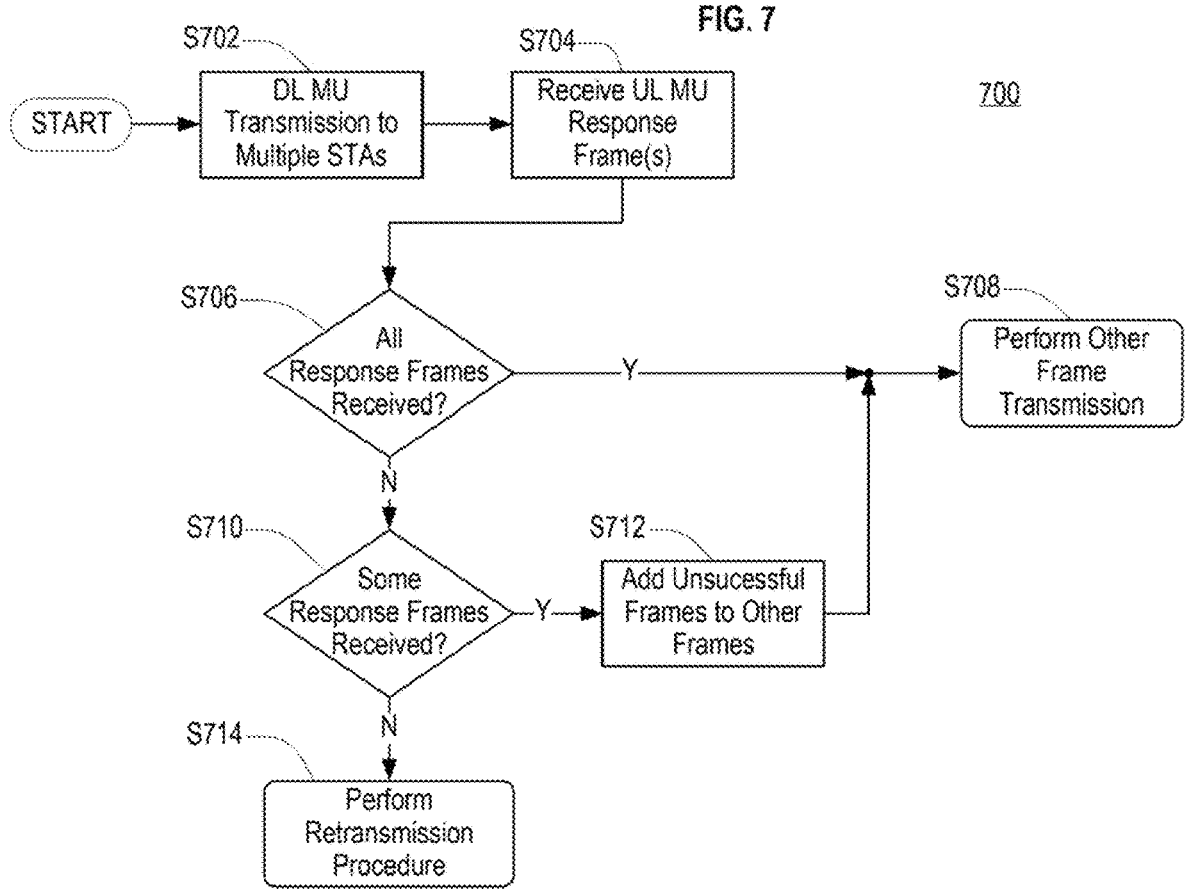
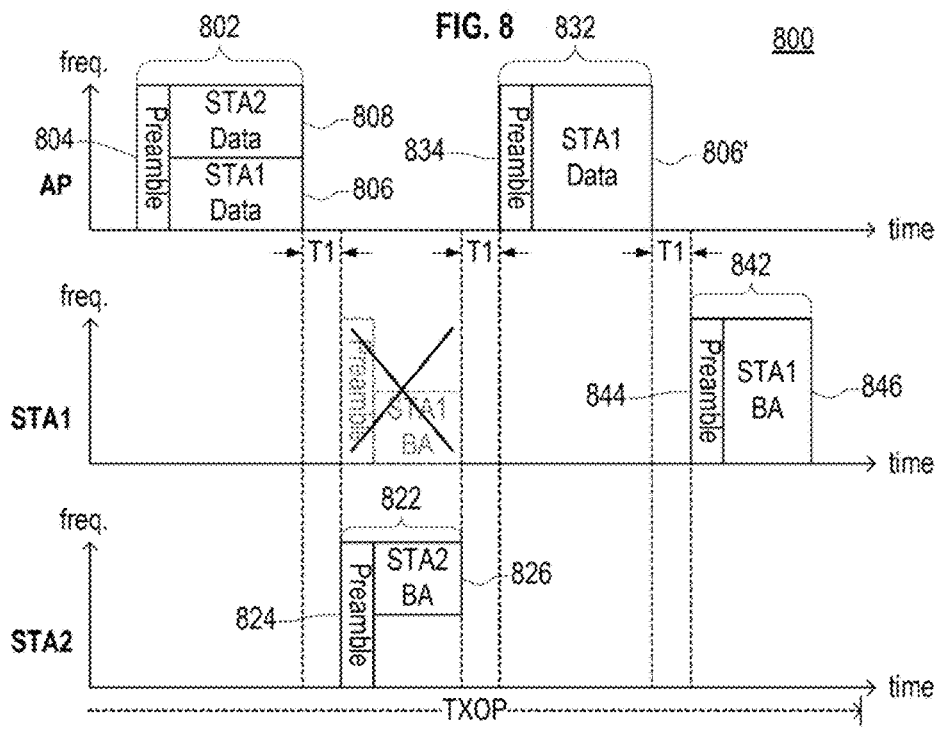

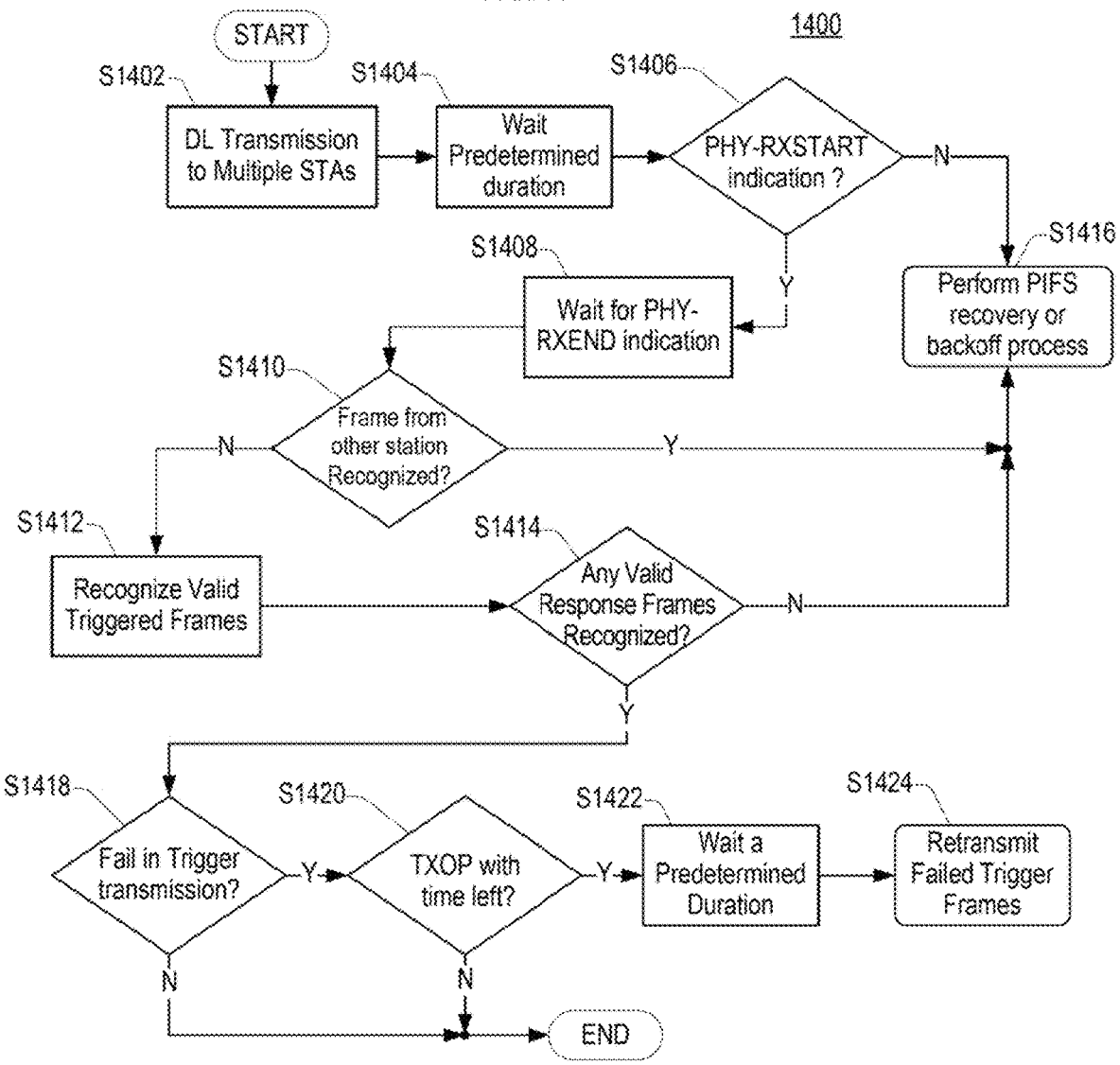
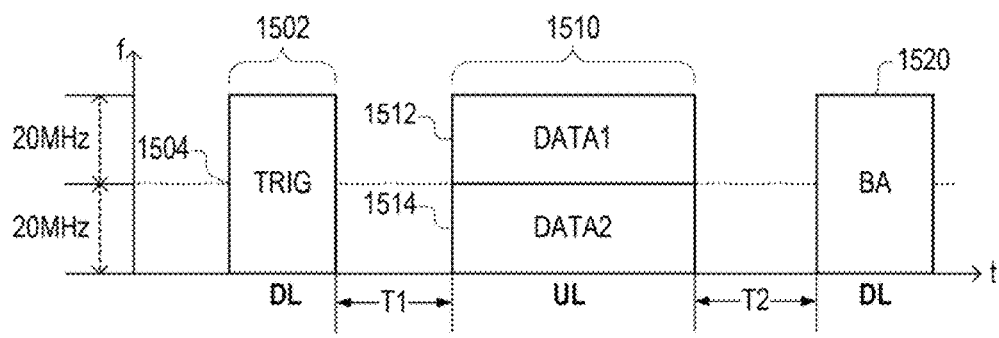

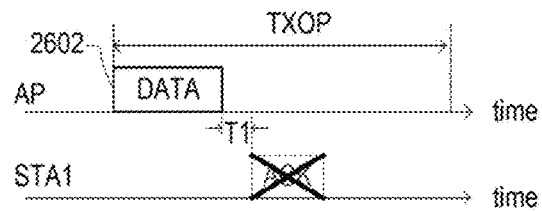
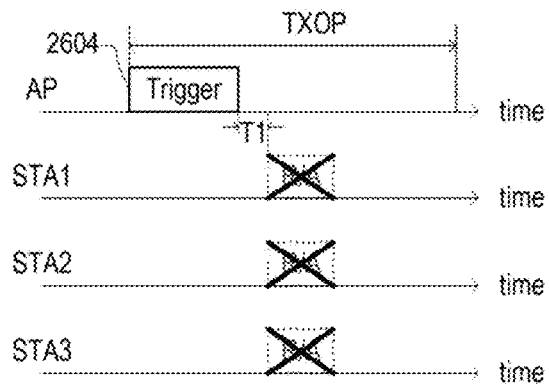
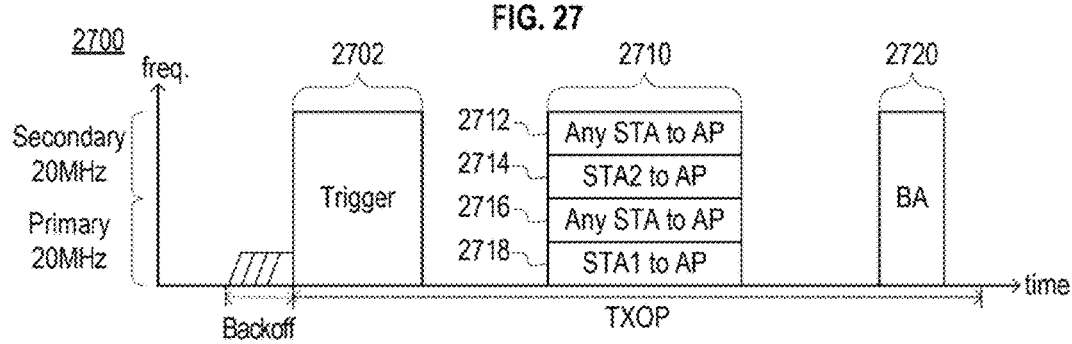
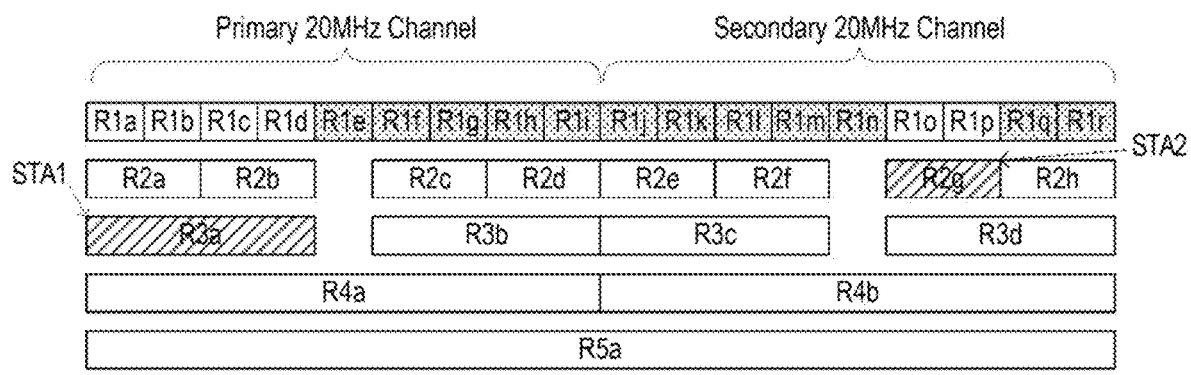

MULTI-USER COMMUNICATION IN WIRELESS NETWORKS

CROSS-REFERENCE TO RELATED APPLICATION

This application is a continuation of U.S. patent application Ser. No. 15/705,047, filed Sep. 14, 2017, which is a continuation of U.S. patent application Ser. No. 15/136,845, filed Apr. 22, 2016, now U.S. Pat. No. 9,794,098, issued Oct. 17, 2017, which claims the benefit of U.S. Provisional Patent Application No. 62/152,497, filed Apr. 24, 2015, U.S. Provisional Patent Application No. 62/214,127, filed Sep. 3, 2015, U.S. Provisional Patent Application No. 62/173,893, filed Jun. 10, 2015, U.S. Provisional Patent Application No. 62/181,141, filed Jun. 17, 2015, and U.S. Provisional Patent Application No. 62/214,867, filed Sep. 4, 2015.

BACKGROUND

1. Technical Field

The technology described herein relates generally to wireless networking. More particularly, the technology relates to simultaneous communications between stations in a wireless network using one or more of Multi-User (MU) Multi-Input-Multi-Output (MIMO) and MU Orthogonal Frequency Division Multiple Access (OFDMA) technologies.

2. Description of the Related Art

Wireless LAN (WLAN) devices are currently being deployed in diverse environments. Some of these environments have large numbers of access points (APs) and non-AP stations in geographically limited areas. In addition, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (IEEE 802.11n). The IEEE Std 802.11 was subsequently amended by IEEE Std 802.11ae™-2012, IEEE Std 802.11aa™-2012, IEEE Std 802.11ad™-2012, and IEEE Std 802.11ac™-2013 (IEEE 802.11ac).

Recently, an amendment focused on providing a High Efficiency (HE) WLAN in high-density scenarios is being developed by the IEEE 802.11ax task group. The 802.11ax amendment focuses on improving metrics that reflect user experience, such as average per station throughput, the 5th percentile of per station throughput of a group of stations, and area throughput. Improvements may be made to support environments such as wireless corporate offices, outdoor hotspots, dense residential apartments, and stadiums.

An HE WLAN supports Down-Link (DL) and Up-Link (UL) Multi-User (MU) transmissions such as MU Orthogonal Frequency Division Multiple Access (MU OFDMA) transmissions and Multi-User Multi-Input-Multi-Output (MU MIMO) transmissions.

In an UL MU transmission, an Access Point (AP) may transmit a frame requiring an immediate response to a plurality of stations, such as a trigger frame or another type of frame. In response, the plurality of stations simultaneously transmit respective UL MU transmission frames to the AP.

Each of UL MU OFDMA frames transmitted by the stations may include a first portion transmitted across an entire bandwidth of a wireless channel and a second portion transmitted using only part of the bandwidth of the wireless channel. The respective first portions of the UL MU OFDMA frames are transmitted using a same range of frequencies (that is, using the same subchannels) as each other. In contrast, the respective second portions of the UL MU OFDMA frames are each transmitted using respective ranges of frequencies (that is, respective subchannels) allocated exclusively to each second portion.

A first WLAN device may transmit, over a channel, a frame that requires acknowledgement by an intended recipient of the frame. A second WLAN device that successfully receives the frame and that is the intended recipient of the frame may transmit an Acknowledgement (ACK) or a Block Acknowledgment (BA) frame to the first WLAN device to indicate that the frame was successfully received.

However, when the second WLAN device does not successfully receive the frame, the ACK or BA frame is not transmitted. Furthermore, even when the ACK or BA frame is transmitted, the first WLAN may not successfully receive the ACK or BA frame.

When the first WLAN device does not receive the ACK or BA frame, the first WLAN device may retransmit the frame after i) performing a Backoff procedure or a Point Coordination Function (PCF) IFS (PIFS) recovery, and 2) checking that the channel is idle. However, under some circumstances, performing the Backoff procedure or PIFS recovery and checking that the channel is idle may be unnecessary and may cause the capacity of the channel to be used inefficiently.

In a WLAN that supports MU MIMO or MU OFDMA, a single transmission by the first WLAN device may have a plurality of intended recipients and may require a plurality of independent ACK or BA frames in response. In such a WLAN, under some circumstances, performing the Backoff procedure or PIFS recovery and checking that the channel is idle when an ACK or BA frame is not received may be unnecessary and may cause the capacity of the channel to be used inefficiently.

Furthermore, when an AP solicits an UL MU frame requiring a plurality of immediate responses from a plurality of stations, under some circumstances, performing the Backoff procedure or PIFS recovery and checking that the channel is idle when an ACK or BA frame is not received may be unnecessary and may cause the capacity of the channel to be used inefficiently.

In a distributed wireless networks such as one operating according to an IEEE 802.11 standard, chances of multiple nearby stations transmitting simultaneously may be significantly reduced by utilizing a listen-before-talk protocol. In this protocol, when a station intends to transmit a frame, the station listens to the wireless medium first, and the station is allowed to transmit only when the wireless medium is not busy. In an IEEE 802.11 standard, the condition for the wireless medium being busy is extended to include virtual carrier sensing.

However, if the concept of random access is included into an IEEE 802.11 standard, because the transmitter of a trigger frame for random access does not know which station will participate in the random access, sometimes there will not be any responses to the trigger frame. This lack of response may not work properly with virtual carrier sensing, and thus may increase collision probability.

A WLAN that supports MU MIMO or MU OFDMA may include a process to allocate resources to random access communications, wherein one or more WLAN devices contend for use of the allocated resources without being individually scheduled to use the allocated resources. When a transmission by a WLAN device, such as an AP, explicitly or implicitly allocates resources of a following period of time to Random Access communication of other WLAN devices, performing a Backoff procedure or other error recovery procedure when no frames are received on the allocated resources may be unnecessary and may cause the capacity of the channel to be used inefficiently.

When a WLAN device allocates resources to random access transmissions of other WLAN devices, measures may need to be taken to prevent the channels, including the allocated resources, from being sensed as idle by WLAN devices not involved in the Random Access communications, that is, third party WLAN devices.

In distributed wireless networks such as a WLAN operated according to an IEEE 802.11 standard, a wireless medium is shared by many stations, and thus, packet transmission errors occur due to interference caused by multiple stations transmitting SU packets simultaneously. When a packet transmission error occurs, a retransmission process defined in the IEEE 802.11 standard may be performed.

However, when an UL MU simultaneous transmission is performed, a plurality of stations under an AP's control can simultaneously transmit to the AP in response to one or more trigger frames transmitted by the AP. For such UL MU transmissions, an IEEE 802.11n or 802.11ac scheme regarding the allocation of transmission bandwidth for response frames may not work properly, especially when the AP transmits more than one trigger frame simultaneously.

SUMMARY

In an embodiment, a method, implemented by an Access Point (AP), for performing a Multi-User (MU) transmission comprises allocating, by the AP, a plurality of resources of an Up-Link (UL) MU transmission to a first plurality of stations, and transmitting, by the AP using one or more 20 MHz channels, a Down-Link (DL) PHY Layer Convergence Procedure (PLCP) Protocol Data Unit (PPDU). The DL PPDU includes trigger information. The trigger information solicits the first plurality of stations to participate in the UL MU transmission using the allocated resources. All of the allocated resources are in the one or more 20 MHz channels of the DL PPDU.

In an embodiment, the allocated resources include at least one resource in each of the one or more 20 MHz channels of the DL PPDU.

In an embodiment, a transmission bandwidth of a physical layer preamble part of the response frame is the same as the transmission bandwidth of a physical layer preamble part of the DL PPDU.

In an embodiment, the DL PPDU is a DL Multi-User (MU) PPDU.

In an embodiment, the trigger information is represented in a trigger Medium Access Control (MAC) Data Protocol Unit (MPDU) that solicits a response frame from a station of the first plurality of stations, and the method further comprises allocating a resource of the UL MU transmission to the response frame. The resource is outside of a bandwidth of the trigger MPDU.

In an embodiment, the bandwidth of the trigger MPDU is a physical layer bandwidth, within the one or more 20 MHz channels, in which the trigger MPDU is physically encoded.

In an embodiment, the method further comprises including a second MPDU in the DL PPDU. The second MPDU is different from the trigger MPDU and occupies a different bandwidth from the trigger MPDU.

In an embodiment, the method further comprises including an indication of a bandwidth of the UL MU transmission in the trigger MPDU.

In an embodiment, the UL MU transmission is a UL Orthogonal Frequency Division Multiple Access (OFDMA) transmission.

In an embodiment, the method further comprises including, by the AP, an indication in the trigger information that all portions of the one or more 20 MHz channels of the DL PPDU that are unallocated to a station for the UL MU transmission permit random access in the UL MU transmission.

In an embodiment, in each 20 MHz channel at least one resource is allocated in the UL MU transmission that is not allocated for random access.

In an embodiment, an apparatus comprises an Access Point (AP). The AP is configured to allocate a plurality of resources of an Up-Link (UL) MU transmission to a first plurality of stations, and to transmit, using one or more 20 MHz channels, a Down-Link (DL) PHY Layer Convergence Procedure (PLCP) Protocol Data Unit (PPDU). The DL PPDU includes trigger information. The trigger information solicits the first plurality of stations to participate in the UL MU transmission using the allocated resources. The allocated resources include at least one resource in each of the one or more 20 MHz channels.

In an embodiment, all of the allocated resources are in the one or more 20 MHz channels of the DL PPDU.

In an embodiment, a transmission bandwidth of a physical layer preamble part of the response frame is the same as the transmission bandwidth of a physical layer preamble part of the DL PPDU.

In an embodiment, the DL PPDU is a DL Multi-User (MU) PPDU.

In an embodiment, the trigger information is represented in a trigger Medium Access Control (MAC) Data Protocol Unit (MPDU) that solicits a response frame from a station of the first plurality of stations. The AP is configured to allocate a resource of the UL MU transmission to the response frame. The resource is outside of a bandwidth of the trigger MPDU.

In an embodiment, the bandwidth of the trigger MPDU is a physical layer bandwidth, within the one or more 20 MHz channels, in which the trigger MPDU is physically encoded.

In an embodiment, the AP is configured to include a second MPDU in the DL PPDU. The second MPDU is different from the trigger MPDU and occupies a different bandwidth from the trigger MPDU.

In an embodiment, the AP is configured to include an indication of a bandwidth of the UL MU transmission in the trigger MPDU.

In an embodiment, the UL MU transmission is a UL Orthogonal Frequency Division Multiple Access (OFDMA) transmission.

In an embodiment, the AP is configured to include an indication in the trigger information that all portions of the one or more 20 MHz channels of the DL PPDU that are unallocated to a station for the UL MU transmission permit random access in the UL MU transmission.

In an embodiment, in each 20 MHz channel at least one resource is allocated in the UL MU transmission that is not allocated for random access.

BRIEF DESCRIPTION OF THE DRAWINGS

FIG. 7 illustrates a process for performing DL MU transmissions according to an embodiment.

FIG. 8 illustrates a DL MU transmission sequence according to an embodiment.

FIG. 14 illustrates a process for handling a transmission failure of a DL MU PPDU, according to another embodiment.

FIG. 15 illustrates an UL MU transmission.

FIG. 26A illustrates an operation wherein an AP initiates a TXOP by sending a data frame and does not receive a response.

FIG. 26B illustrates an operation wherein an AP initiates a TXOP by sending a trigger frame and does not receive a response, according to an embodiment.

FIG. 27 illustrates an operation of an UL MU transmission including random access channels according to an embodiment.

FIG. 28 illustrates an allocation of building blocks in a frame wherein unallocated resources may be used for random access, according to an embodiment.

DETAILED DESCRIPTION

Figure 1:
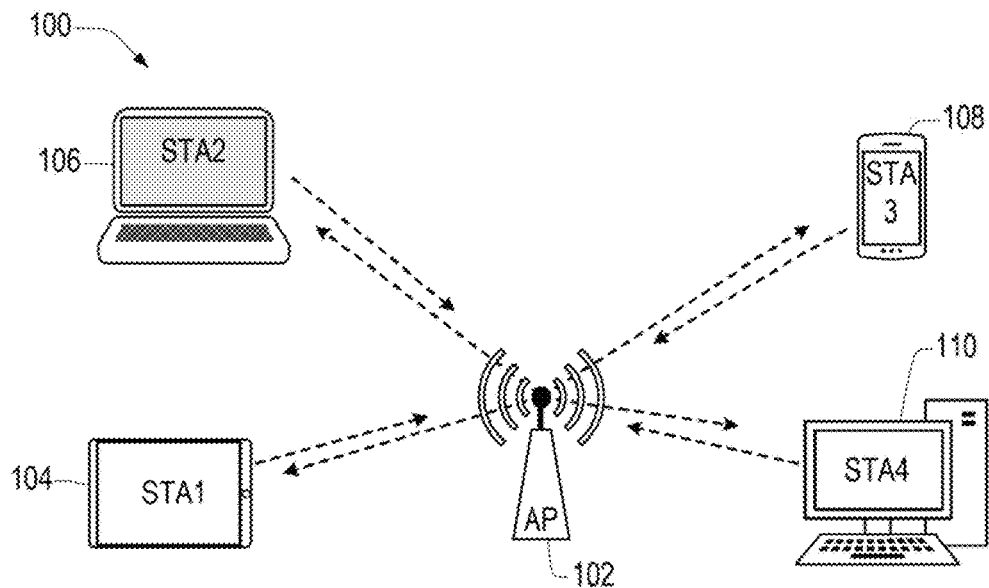
FIG. 1 illustrates a wireless network according to an embodiment.

The technology described herein relates generally to wireless networking. More particularly, the technology relates to simultaneous communications between stations in a wireless network using one or more of Multi-User (MU) Multi-Input-Multi-Output (MIMO) and MU Orthogonal Frequency Division Multiple Access (OFDMA) technologies.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Like reference numerals designate like elements in the specification.

FIG. 1 illustrates a wireless network according to an embodiment. The wireless network includes an infrastructure Basic Service Set (BSS) 100 of a Wireless Local Area Network (WLAN). In an 802.11 wireless LAN (WLAN), the BSS provides the basic organizational unit and typically includes an Access Point (AP) and one or more associated stations (STAs). In FIG. 1, the BSS 100 includes an Access Point 102 (also referred to as the AP) wirelessly communicating with first, second, third, and fourth wireless devices (or stations) 104, 106, 108, and 110 (also referred to as stations STA1, STA2, STA3, and STA4, respectively). The wireless devices may each include a medium access control layer (MAC) and a physical layer (PHY) according to an IEEE 802.11 standard.

Although FIG. 1 shows the BSS 100 including only the first to fourth stations STA1 to STA4, embodiments are not limited thereto and may comprise BSSs including any number of stations.

The AP 102 is a station, that is, a STA, configured to control and coordinate functions of the BSS 100. The AP 102 may transmit information to a single station selected from the plurality of stations STA1 to STA4 in the BSS 100 using a single frame, or may simultaneously transmit information to two or more of the stations STA1 to STA4 in the BSS 100 using either a single Orthogonal Frequency Division Multiplexing (OFDM) broadcast frame, a single OFDM Multi-User Multi-Input-Multi-Output (MU-MIMO) transmission, a single Orthogonal Frequency Division Multiple Access (OFDMA) frame, or a single transmission performed using both OFDMA and MU-MIMO.

The stations STA1 to STA4 may each transmit data to the AP 102 using a single frame, or transmit information to and receive information from each other using a single frame. Two or more of the stations STA1 to STA4 may simultaneously transmit data to the AP 102 using an Uplink (UL) OFDMA frame. When the BSS 100 supports MU-MIMO, two or more of the stations STA1 to STA4 may simultaneously transmit data to the AP 102 using an UL frame.

In another embodiment, the AP 102 may be absent and the stations STA1 to STA4 may be in an ad-hoc network.

Each of the stations STA1 to STA4 and the AP 102 includes a processor and a transceiver, and may further include a user interface and a display device.

The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium. The transceiver represents a unit functionally connected to the processor, and designed to transmit and receive a frame through the wireless network.

The transceiver may include a single component that performs the functions of transmitting and receiving, or two separate components each performing one of such functions. The processor and transceiver of the stations STA1 to STA4 and the AP 102 may be respectively implemented using hardware components, software components, or both.

The AP 102 may be or may include a WLAN router, a stand-alone Access Point, a WLAN bridge, a Light-Weight Access Point (LWAP) managed by a WLAN controller, and the like. In addition, a device such as a personal computer, tablet computer, or cellular phone may configured able to operate as the AP 102, such as when a cellular phone is configured to operate as a wireless "hot spot."

Each of the stations STA1 to STA4 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but embodiments are not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

A type and subtype of a frame may be identified using a type field and a subtype field included in a control field of the frame, as prescribed in the applicable standard.

Figure 2:
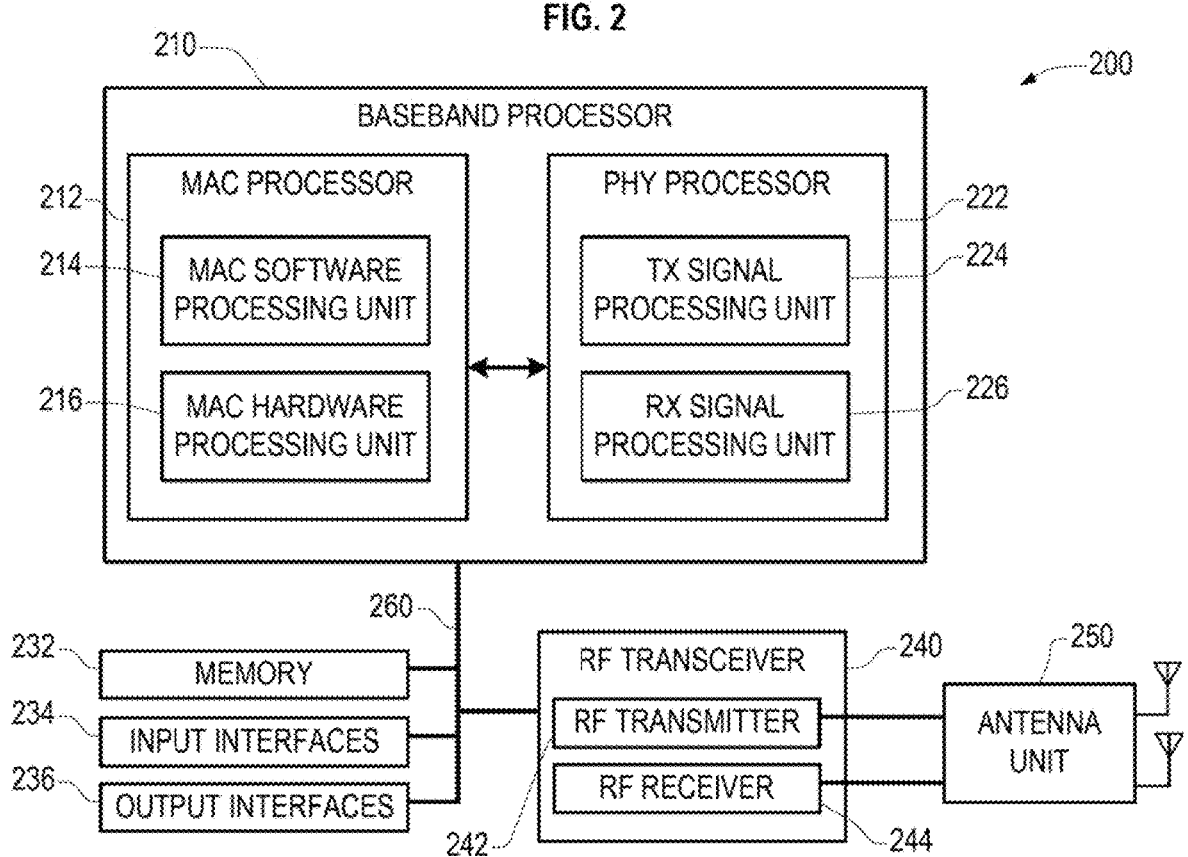
FIG. 2 is a schematic diagram of a wireless device according to an embodiment.

FIG. 2 illustrates a schematic block diagram of a wireless device 200 according to an embodiment. The wireless or WLAN device 200 may be included in the AP 102 or any of the stations STA1 to STA4 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a MAC processor 212 and a PHY processor 222. The baseband processor 210 may utilize the storage device 232, which may include a non-transitory computer readable medium having software (e.g., computer programming instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit (SPU) 224 and a receiving SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beam-formed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, touch screen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

Figure 3A:
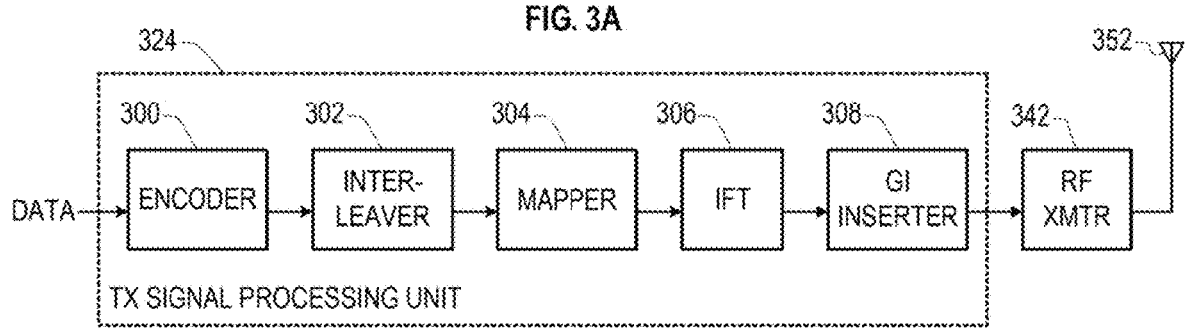
FIG. 3A illustrates components of a wireless device configured to transmit data according to an embodiment.

FIG. 3A illustrates components of a wireless device configured to transmit data according to an embodiment, including a Transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data DATA. In an embodiment, the encoder 300 includes a forward error correction (FEC) encoder. The FEC encoder may include a binary convolutional code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs the BCC encoding, and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to the constellation mapping.

When the TxSP 324 performs a MIMO or MU-MIMO transmission, the TxSP 324 may include a plurality of interleavers 302 and a plurality of mappers 304 according to a number NSS of spatial streams of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number NSTS of space-time streams and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IIFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
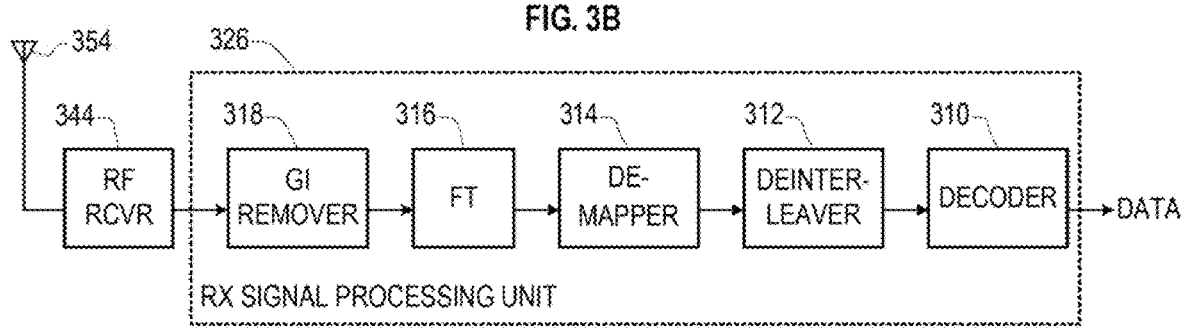
FIG. 3B illustrates components of a wireless device configured to receive data according to an embodiment.

FIG. 3B illustrates components of a wireless device configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using the LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using the BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs the BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 200 will assess the availability of the wireless medium using Clear Channel Assessment (CCA). If the medium is occupied, CCA may determine that it is busy, while if the medium is available, CCA determines that it is idle.

Figure 4:
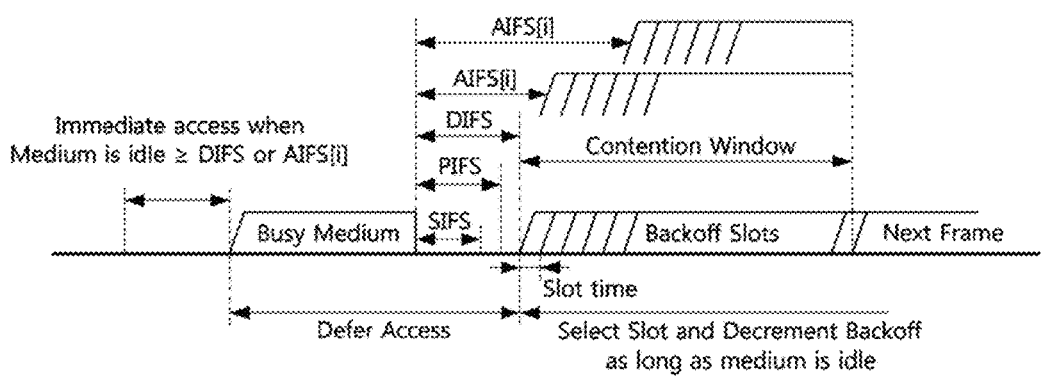
FIG. 4 illustrates Inter-Frame Space (IFS) relationships.

FIG. 4 illustrates Inter-Frame Space (IFS) relationships. FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time.

A data frame is used for transmission of data forwarded to a higher layer. The WLAN device transmits the data frame after performing backoff if a DIFS has elapsed during which DIFS the medium has been idle.

A management frame is used for exchanging management information, which is not forwarded to the higher layer. Subtype frames of the management frame include a beacon frame, an association request/response frame, a probe request/response frame, and an authentication request/response frame.

A control frame is used for controlling access to the medium. Subtype frames of the control frame include a request to send (RTS) frame, a clear to send (CTS) frame, and an acknowledgement (ACK) frame.

When the control frame is not a response frame of another frame, the WLAN device transmits the control frame after performing backoff if a DIFS has elapsed during which DIFS the medium has been idle. When the control frame is the response frame of another frame, the WLAN device transmits the control frame after a SIFS has elapsed without performing backoff or checking whether the medium is idle.

A WLAN device that supports a Quality of Service (QoS) functionality (that is, a QoS station) may transmit the frame after performing backoff if an AIFS for an associated access category (AC), (AIFS[AC]), has elapsed. When transmitted by the QoS station, any of the data frame, the management frame, and the control frame which is not the response frame may use the AIFS[AC] of the AC of the transmitted frame.

A WLAN device may perform a backoff procedure when the WLAN device that is ready to transfer a frame finds the medium busy. In addition, a WLAN device operating according to the IEEE 802.11n and 802.11ac standards may perform the backoff procedure when the WLAN device infers that a transmission of a frame by the WLAN device has failed.

The backoff procedure includes determining a random backoff time composed of N backoff slots, each backoff slot having a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device detects no medium activity for the duration of a particular backoff slot, the backoff procedure shall decrement the backoff time by the slot time. When the WLAN determines that the medium is busy during a backoff slot, the backoff procedure is suspended until the medium is again determined to be idle for the duration of a DIFS or EIFS period. The WLAN device may perform transmission or retransmission of the frame when the backoff timer reaches zero.

The backoff procedure operates so that when multiple WLAN devices are deferring and execute the backoff procedure, each WLAN device may select a backoff time using a random function, and the WLAN device selecting the smallest backoff time may win the contention, reducing the probability of a collision.

Figure 5:
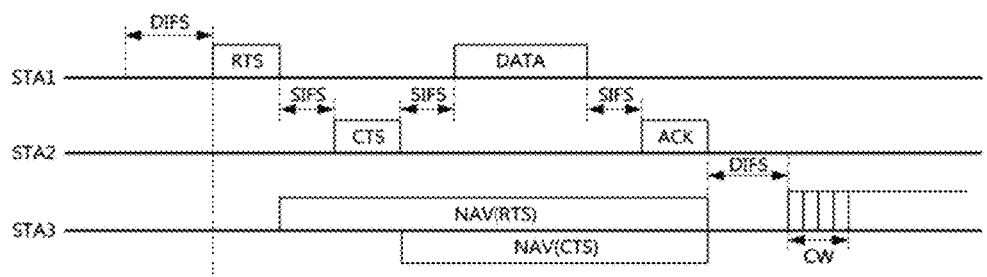
FIG. 5 illustrates a Carrier Sense Multiple Access/Collision Avoidance (CSMA/CA) based frame transmission procedure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1, a frame transmitted from the second station STA2, or both can be received. The stations STA1, STA2, and STA3 may be WLAN devices.

The STA1 may determine whether the channel is busy by carrier sensing. The STA1 may determine the channel occupation based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the STA1 may transmit a Ready-To-Send (RTS) frame to the second station STA2. Upon receiving the RTS frame, after a SIFS the second station STA2 may transmit a Clear-To-Send (CTS) frame as a response of the RTS frame.

When the third station STA3 receives the RTS frame, it may set a NAV timer of the third station STA3 for a transmission duration of subsequently transmitted frames (for example, a duration of SIFS+CTS frame duration+SIFS+data frame duration+RFS+ACK frame duration) using duration information included in the RTS frame. When the third station STA3 receives the CTS frame, it may set the NAV timer of the third station STA3 for a transmission duration of subsequently transmitted frames using duration information included in the CTS frame. Upon receiving a new frame before the NAV timer expires, the third station STA3 may update the NAV timer of the third station STA3 by using duration information included in the new frame. The third station STA3 does not attempt to access the channel until the NAV timer expires.

When the STA1 receives the CTS frame from the second station STA2, it may transmit a data frame to the second station STA2 after SIFS elapses from a time when the CTS frame has been completely received. Upon successfully receiving the data frame, the second station STA2 may transmit an ACK frame as a response of the data frame after SIFS elapses.

When the NAV timer expires, the third station STA3 may determine whether the channel is busy using the carrier sensing. Upon determining that the channel is not used by other devices during a DIFS after the NAV timer has expired, the third station STA3 may attempt to access the channel after a contention window according to a backoff process elapses.

Figure 6A:
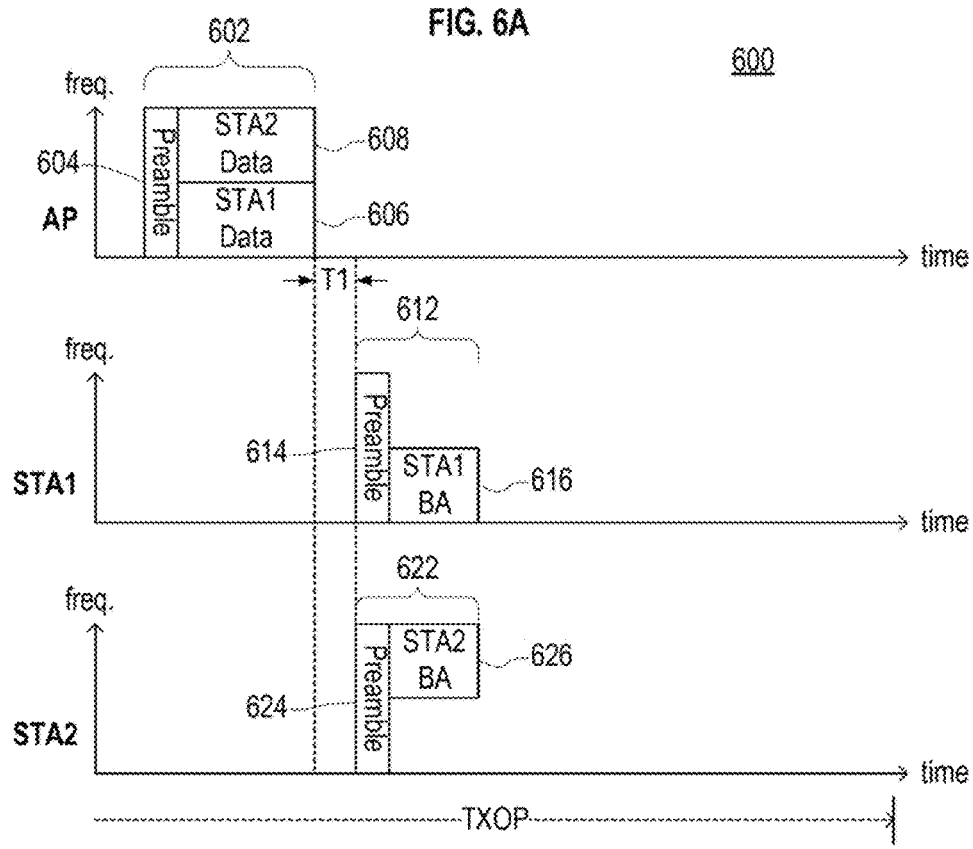
FIG. 6A shows a transmission sequence for a Down-Link (DL) Multi-User (MU) communication.

FIG. 6A shows a transmission sequence 600 for a Down-Link (DL) Multi-User (MU) communication. An AP transmits a DL Orthogonal Frequency Division Multiple Access (OFDMA) data transmission 602 to a first station STA1 and a second station STA2 within an ongoing Transmission Opportunity (TXOP). The DL OFDMA transmission 602 includes a first DL preamble 604 and a payload, the payload including a first data frame 606 intended for the first station STA1 and a second data frame 608 intended for the second station STA2.

The AP allocates an entire transmission bandwidth of a first portion of the DL OFDMA transmission 602 to the first DL preamble 604. The AP allocates a lower half of the transmission bandwidth of a second portion of the DL OFDMA transmission 602 to the first data frame 606. The AP allocates an upper half of the transmission bandwidth of the second portion of the DL OFDMA transmission 602 to the second data frame 608.

When both the first station STA1 and the second station STA2 successfully received the DL OFDMA transmission 602, a first predetermined time T1 after the AP completes the DL OFDMA transmission 602 both the first station STA1 and the second station STA2 may send an Up-Link (UL) OFDMA acknowledgement transmission comprised of a first UL transmission 612 and a second UL transmission 622. The first UL transmission 612 may be transmitted by the first station STA1 and the second UL transmission 622 may be transmitted by the second station STA2. The first UL transmission 612 and a second UL transmission 622 may be transmitted simultaneously and may air-combine in the channel to form the UL OFDMA acknowledgement transmission. The first predetermined time T1 may be a SIFS.

The first UL transmission 612 includes a first UL preamble 614 occupying an entire transmission bandwidth of a first portion of the first UL transmission 612, and a first Block Acknowledgement (BA) frame 616 occupying a lower half of the transmission bandwidth of a second portion of the first UL transmission 612.

The second UL transmission 622 includes a second UL preamble 624 occupying an entire transmission bandwidth of a first portion of the second UL transmission 622, and a second BA frame 626 occupying an upper half of the transmission bandwidth of a second portion of the second UL transmission 622.

Durations of the first and second portions of the first UL transmission 612 may be the same as durations of the first and second portions of the second UL transmission 622, respectively. In an embodiment, the first UL preamble 614 is identical to the second UL preamble 624.

Upon receiving the UL OFDMA acknowledgement transmission, the AP infers that the first data frame 606 and the second data frame 608 have been successfully communicated.

Figure 6B:
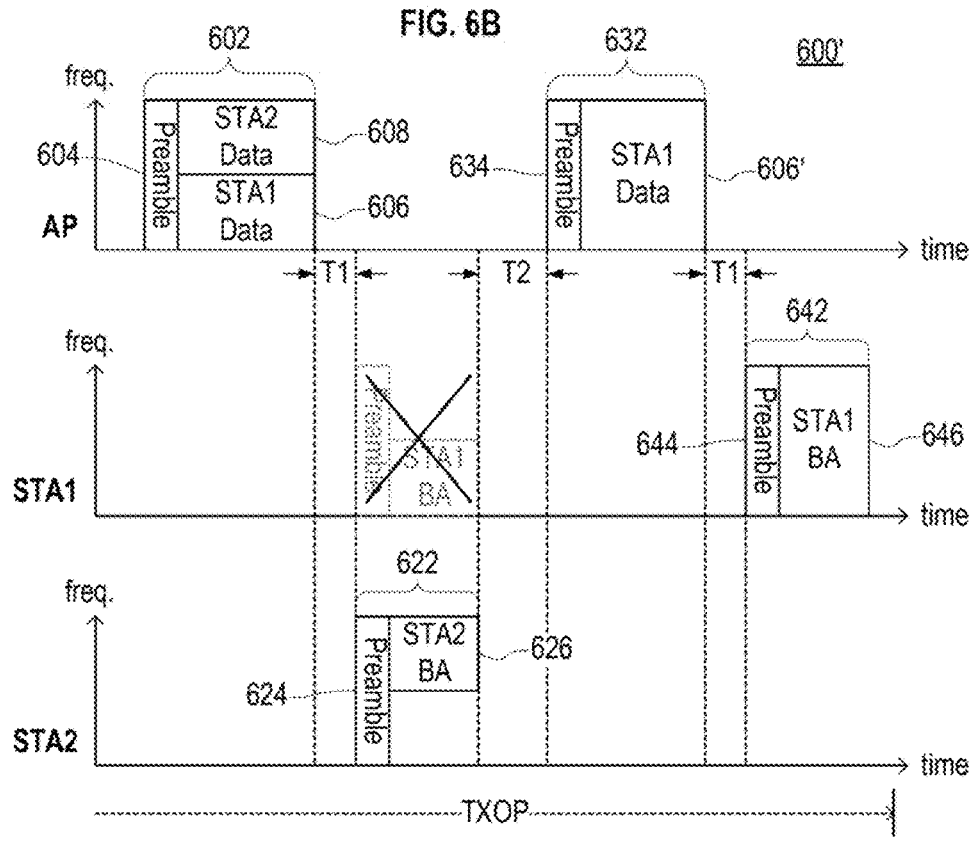
FIG. 6B shows a transmission sequence including a transmission error for a DL MU communication.

FIG. 6B shows a transmission sequence 600' for a DL MU communication. In the transmission sequence 600', the AP infers that the first station STA1 did not successfully receive the DL OFDMA transmission 602, either because i) the first station STA1 did not successfully receive the DL OFDMA transmission 602 and therefore did not transmit first UL transmission 612, or ii) because when the first station STA1 did successfully receive the DL OFDMA transmission 602, the AP does not successfully receive the first BA frame 616 of FIG. 6A.

According to an IEEE 802.11 Enhanced Distributed Channel Access (EDCA) backoff procedure, when the AP did not receive the first BA frame 616 in the prescribed period of time, the AP may perform a PIFS recovery or perform a backoff as a response to a transmission failure within the TXOP. The detailed procedure for the ACK procedure and multiple frame transmission in an EDCA TXOP are described below:

After transmitting a MAC Data Protocol Unit (MPDU) that requires an ACK or BA frame as a response, such as the first data frame 606, a station (in FIG. 6B, an AP) waits for an AckTimeout interval. If a PHY-RXSTART.indication primitive indicating a start of reception of a frame does not occur during the AckTimeout interval, the station concludes that the transmission of the MPDU has failed, and the station invokes its backoff procedure upon expiration of the AckTimeout interval.

When a PHY-RXSTART.indication primitive does occur during the AckTimeout interval, the station shall wait for the corresponding PHY-RXEND.indication primitive indicating an end of reception of the frame to determine whether the MPDU transmission was successful. The recognition of a valid ACK frame sent by the recipient of the MPDU requiring acknowledgment, corresponding to the PHY-RXEND.indication primitive, shall be interpreted as a successful acknowledgment, permitting the frame sequence to continue, or to end without retries, as appropriate for the particular frame sequence in progress. The recognition of anything else, including any other valid frame, shall be interpreted as a failure of the MPDU transmission.

After a valid response to the initial frame of a TXOP, if the Duration/ID field is set for multiple frame transmission and there is a subsequent transmission failure, the corresponding channel access function of the station may transmit after the Carrier Sense (CS) mechanism indicates that the medium is idle at the TxPIFS slot boundary, provided that the duration of that transmission plus the duration of any expected acknowledgment and applicable IFS is less than the remaining Transmission Network Allocation Vector (TXNAV) timer value.

As a result, based on the conventional ACK procedure, after the AP sent the data frames 606 and 608, the AP received a valid response only from the second station STA2 for the second data frame 608, which implies that PHY-RXSTART.indication primitive occurred during the AckTimeout interval. However, at the end of the acknowledgement frame reception sent from the second station STA2, the AP did not receive any valid ACK from the first station STA1 for the first data frame 606, which shall be interpreted as a failure of the MPDU transmission of the first data frame 606.

Because of the MPDU transmission failure, the AP may perform a PIFS recovery procedure. Therefore, in FIG. 6B, when the AP received an acknowledgement frame from the second station STA2, the AP checks for a second predetermined time T2 (which may equal a PIFS) whether the medium is idle, and when the medium is idle, the AP performs a DL transmission 632 including a second DL preamble 634 and the retransmitted first data frame 606'.

In response, the first station STA1 performs an UL transmission 642 including a third UL preamble 644 and a third BA frame 646 beginning at the first predetermined time T1 after successfully received the DL transmission 632.

As shown in FIG. 6B, if the acknowledgement frames are sent back in UL MU transmission manner, such as an UL OFDMA transmission, unless the AP receives acknowledgement frames from all of the stations scheduled for a DL MU transmission, the AP shall perform either a PIFS recovery or a backoff as a response to a transmission failure when the AP is within a TXOP. However, when the AP sends a DL MU PHY Layer Convergence Procedure (PLCP) Protocol Data Unit (PPDU) and receives acknowledgement frames from some part of the target stations of the DL MU PPDU, the wireless medium is continuously occupied by the DL MU transmission sequence during not only the DL transmission and also during the UL acknowledgement frame transmission. Therefore, performing PIFS recovery or backoff in this situation only increases the overall delay and increases the likelihood that the already-obtained TXOP will be interrupted by a third party station, which may reduce the overall performance of the WLAN.

Embodiments of the present disclosure include apparatus and methods for error recovery process for DL MU transmission to prevent this potential reduction of performance.

FIG. 7 illustrates a process 700 for performing MU DL transmissions in a TXOP according to an embodiment. The process 700 may be performed by an AP.

At S702, an AP performing the process 700 sends multiple frames to respectively multiple stations simultaneously in a DL MU transmission performed during a TXOP. The AP expects immediate respective response frames (such as ACK frames) from the receivers of the frames. The expected response frames are to be transmitted back to the AP in an UL MU transmission.

At S704, the process 700 attempts to receive the expected response frames for a predetermined time after the DL MU transmission. The expected response frames, if any, are included in an UL MU transmission. In an embodiment, the predetermined time is an AckTimeout interval.

At S706, the process 700 determines whether all the expected response frames were received in a PPDU for which reception started during the predetermined time after the DL MU transmission. When the AP determines that all the expected response frames were received, the AP determines that a successful acknowledgement has occurred and the process 700 proceeds to S708. Otherwise, at S706 the process 700 proceeds to S710.

At S708, the process 700 can continue by performing other frame transmission procedures as regular multiple frame transmission in an EDCA TXOP. The other frame transmissions may include DL MU transmissions performed according to the process 700.

At S710, the process 700 determines whether at least one of the expected response frames where received. If at least one of the expected response frames where received, the process 700 proceeds to S712. Otherwise, at S710 the process 700 proceeds to S714.

At S712, since at least one of the expected response frames received in predetermined time after DL MU transmission, the AP can include the one or more frames of the DL MU transmission of S702 that did not receive respective response frames in a queue of other frames to be transmitted. The process 700 then proceeds to S708.

At S714, because none of the expected response frames was received in the predetermined time after the DL MU transmission, the AP determines that the whole DL MU transmission has failed, and the AP may initiate a retransmission procedure as a response to the transmission failure within the TXOP.

FIG. 8 illustrates a DL MU transmission sequence 800 according to an embodiment, wherein one of receivers of a DL MU transmission does not successfully receive a respective DL data frame. An AP transmits a DL OFDMA data transmission 802 to a first station STA1 and a second station STA2 within an ongoing Transmission Opportunity (TXOP). The DL OFDMA transmission 802 includes a first DL preamble 804, a first data frame 806 intended for the first station STA1, and second data frame 808 intended for the second station STA2.

The AP allocates an entire transmission bandwidth of a first portion of a DL OFDMA transmission 802 to a first DL preamble 804. The AP allocates a lower half of the transmission bandwidth of a second portion of the DL OFDMA transmission 802 to a first data frame 806. The AP allocates an upper half of the transmission bandwidth of the second portion of the DL OFDMA transmission 802 to the second data frame 808.

The second station STA2 successfully receives the second data frame 808 of the DL OFDMA transmission 802. In response, a first predetermined time T1 after the AP completes the DL OFDMA transmission 802, the second station STA2 transmits an UL OFDMA acknowledgement transmission comprised a first UL transmission 824.

The first UL transmission 822 includes a first UL preamble 824 occupying an entire transmission bandwidth of a first portion of the first UL transmission 822, and a first BA frame 826 occupying an upper half of the transmission bandwidth of a second portion of the first UL transmission 822.

However, either because the first station STA1 did not receive the first data frame 806 of the DL OFDMA transmission 802 correctly and therefore did not send a responsive acknowledgement frame, or because an acknowledgment frame transmitted in response to the first data frame 806 by the first station STA1 was not correctly received by the AP, the AP does not receive an acknowledgement frame for the first data frame 806.

As there is at least one response frame (first BA frame 826) received in the predetermined time after the DL OFDMA transmission 802, the AP may continue another frame transmission procedure as a regular multiple frame transmission in an EDCA TXOP, without performing a backoff procedure or a PIFS recovery. This is because other stations will not sense the medium being used by the AP as idle during the first UL transmission 822.

The AP may include the frame that did not receive the response frame in the other frame transmission procedure. In the example of FIG. 8, the AP does not have any further buffered data. Accordingly, a following second DL frame transmission 832 includes only a preamble 834 and the retransmitted first data frame 806' being sent to the first station STA1.

The AP transmits the second DL frame transmission 832 after the predetermined time T1 after receiving the first UL transmission 822.

The first station STA1 correctly receives the retransmitted first data frame 806' in the second DL frame transmission 832. In response, the first station STA1 performs a second UL transmission 842 the predetermined time T1 after the end of the second DL frame transmission 832. The second UL transmission 842 includes a preamble and a second BA frame 846.

The AP determines that the second DL frame transmission 832 was successful when the AP receives the second BA frame 846 from the first station STA1.

The predetermined time T1 can be a SIFS in some embodiments.

Figure 9:
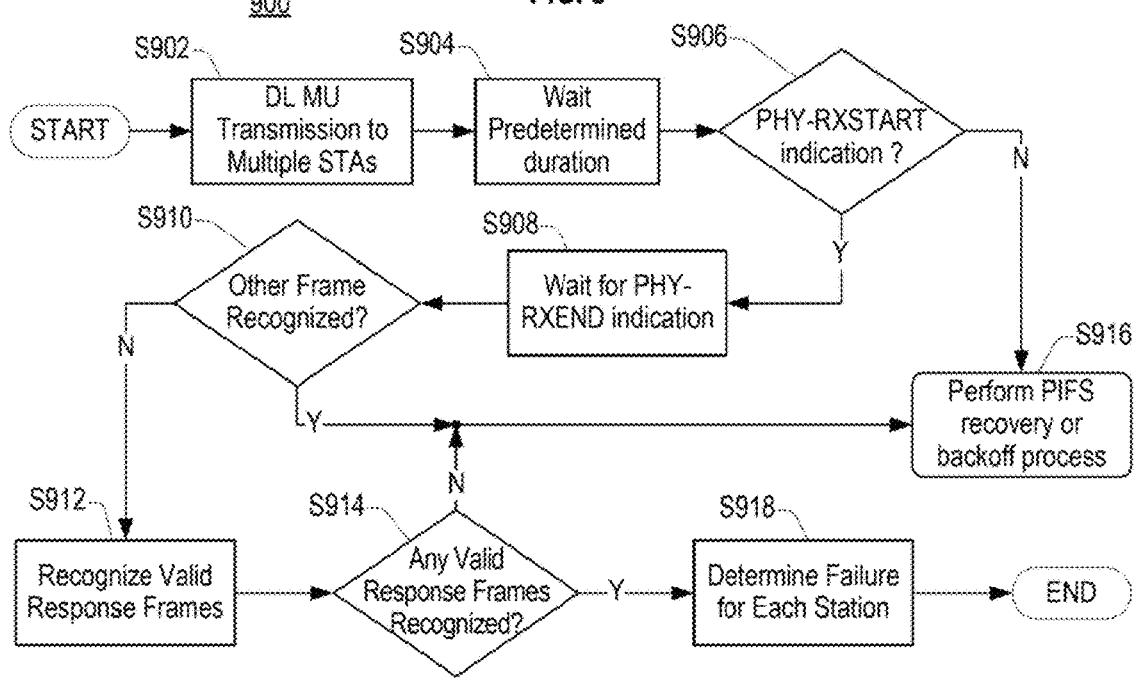
FIG. 9 illustrates a process for handling a transmission failure of a DL Orthogonal Frequency Division Multiple Access (OFDMA) PHY Layer Convergence Procedure (PLCP) Protocol Data Unit (PPDU), according to an embodiment.

FIG. 9 illustrates a process 900 for handling, by an AP, a transmission failure of a DL MU PPDU in an EDCA TXOP, according to an embodiment. In an embodiment, the DL MU PPDU is a DL MU OFDMA PPDU.

At S902, the process 900 transmits one or more MPDUs (A-MPDUs or HE single MPDUs) as part of a DL MU PPDU that is addressed to one or more recipient stations. The one or more MPDUs require one or more immediate response frames, such as acknowledgement frames, from the one or more recipient stations.

At S904, the process 900 waits for a timeout interval of a predetermined duration starting at a PHY-TXEND.confirm primitive. In an embodiment, the predetermined duration is equal to a SIFS plus a slot time plus a PHY receive start delay (that is, aSIFSTime+aSlotTime+aPHY-RX-START-Delay).

At S906, the process 900 determines whether a PHY-RXSTART.indication primitive has occurred during the timeout interval. When the PHY-RXSTART.indication primitive did not occur during the timeout interval, the process 900 determines that the transmission of the DL MU PPDU has failed and proceeds to S916. Otherwise, at S906 the process 900 proceeds to S908.

At S908, the process 900 waits for a PHY-RXEND.indication primitive corresponding to the PHY-RXSTART.indication primitive.

At S910, the process 900 determines whether any frame other than a valid response frame sent by any of the recipients of the DL MU PPDU or any transmission that was not identified or decoded was received in an interval corresponding to the PHY-RXSTART.indication and PHY-RXEND.indication primitives. When the process 900 determines that a frame other than a valid response frame was received, the process 900 determines that the DL MU PPDU transmission has failed and proceeds to S916. Otherwise, at S910 the process 900 proceeds to S912.

At S912, the process 900 recognizes valid response frames received in the interval corresponding to PHY-RXSTART.indication and PHY-RXEND.indication primitives and sent by the one or more recipient stations of the DL MU PPDU requiring one or more response frames.

At S914, the process 900 determines whether at least one valid response frame sent by any of the recipients of the DL MU PPDU was received in the interval corresponding to the PHY-RXSTART.indication and PHY-RXEND.indication primitives. When the process 900 determines that the at least one valid response frame was received, the process 900 proceeds to S918. Otherwise, at S914 the process 900 determines that the DL MU PPDU transmission has failed and proceeds to S916.

At S916, in response to the transmission failure of the DL MU PPDU transmission, the process 900 may perform a PIFS recovery or a backoff within a TXOP.

At S918, the process 900 respectively determines for each recipient station requiring an individual immediate response frame whether a transmission failure of the DL OFDMA PPDU addressed to the recipient station has occurred. The process 900 then ends.

Figure 10:
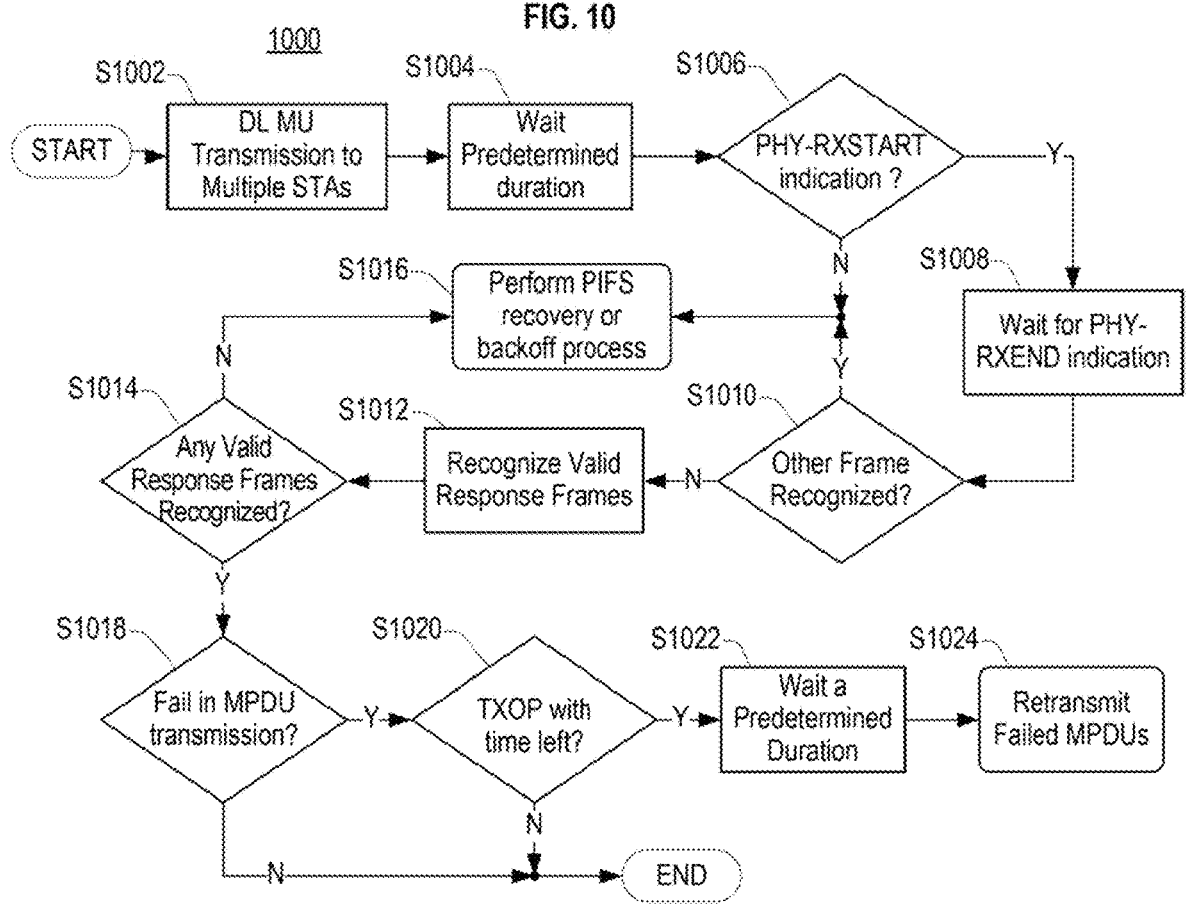
FIG. 10 illustrates a process for handling a transmission failure of a DL OFDMA PPDU, according to another embodiment.

FIG. 10 illustrates a process 1000 for handling, by an AP, a transmission failure of a DL MU PPDU included in a multiple frame transmission of an EDCA TXOP, according to another embodiment. The DL MU PPDU may be the initial frame of the TXOP. In an embodiment, the DL MU PPDU is a DL MU OFDMA PPDU.

At S1002, the process 1000 transmits one or more MPDUs (A-MPDUs or HE single MPDUs) as part of a DL MU PPDU that is addressed to one or more recipient stations. The one or more MPDUs require one or more immediate response frames, such as acknowledgement frames, from the one or more recipient stations.

At S1004, the process 1000 waits for a timeout interval of a predetermined duration starting at a PHY-TXEND.confirm primitive corresponding to the DL MU PPDU. In an embodiment, the predetermined duration is equal to a SIFS plus a slot time plus a PHY receive start delay (that is, aSIFSTime+aSlotTime+aPHY-RX-STARTDelay of an IEEE 802.11 standard).

At S1006, the process 1000 determines whether a PHY-RXSTART.indication primitive has occurred during the timeout interval. When the PHY-RXSTART.indication primitive did not occur during the timeout interval, the process 1000 determines that the transmission of the DL MU PPDU has failed and proceeds to S1016. Otherwise, at S1006 the process 1000 proceeds to S1008.

At S1008, the process 1000 waits for a PHY-RXEND.indication primitive corresponding to the PHY-RXSTART.indication primitive.

At S1010, the process 1000 determines whether any frame was received in an interval corresponding to the PHY-RXSTART.indication and PHY-RXEND.indication primitives other than a valid response frame sent by any of the recipients of the DL MU PPDU or any transmission was received in the interval that was not identified or decoded. When the process 1000 determines that a frame other than the valid response frame or a transmission that was not identified or decoded was received, the process 1000 determines that the DL MU PPDU transmission has failed and proceeds to S1016. Otherwise, at S1010 the process 1000 proceeds to S1012.

At S1012, the process 1000 recognizes valid response frames, sent by the one or more recipient stations of the DL MU PPDU requiring one or more response frames, and received in the interval corresponding to the PHY-RXSTART.indication and PHY-RXEND.indication primitives.

At S1014, the process 1000 determines whether at least one valid response frame sent by any of the recipient of the DL MU PPDU was received in the interval corresponding to the PHY-RXSTART.indication and PHY-RXEND.indication primitives. When the process 1000 determines that the at least one valid response frame was received, the process 1000 proceeds to S1018. Otherwise, at S1014 the process 1000 determines that the DL MU PPDU transmission has failed and proceeds to S1016.

At S1016, in response to the transmission failure of the DL MU PPDU, the process 1000 may perform a PIFS recovery or a backoff within the TXOP.

At S1018, the process 1000 determines whether there was a failure of any of the individual DL MPDU/A-MPDU transmissions of the DL MU PPDU transmission, that is, whether not all of the expected response frames were recognized as valid at S1010. When all of the expected response frames for the DL MU PPDU were recognized as valid at S1010, the process 1000 ends. Otherwise, at S1018 the process 1000 proceeds to S1020.

At S1020, after a valid response to the DL MU PPDU, when a duration of a next transmission plus the duration of any expected acknowledgment and applicable IFS is less than the remaining TXNAV timer value, the process 1000 proceeds to S1022. That is, when the process 1000 determines that enough time remains in the TXOP to perform the next transmission and receive the expected response to the next transmission, the process 100 proceeds to S1022. Otherwise, at S1020 the process 1000 ends.

At S1022, the process 1000 waits a predetermined duration, such as a SIFS. The process 1000 then proceeds to S1024.

At S1024, the process 1000 may transmit, using a corresponding channel access function, the next transmission. The next transmission may include retransmissions of one or more MPDUs transmitted in the DL MU PPDU for which respective valid response frames were not received.

In an embodiment, an AP sends frames to multiple stations simultaneously using a DL MU transmission in a TXOP, and expects immediate response frames from the receivers of the frames. The immediate response frames are expected to be transmitted in a UL MU manner. If there are at least one of the response frames received in a predetermined time after the DL MU transmission, the AP can continue other frame transmission procedure as regular multiple frame transmission in an EDCA TXOP, and the AP can include any frames for which the corresponding expected response frames were not received in the other frame transmission procedure.

Embodiments of the present disclosure include methods for performing multiple frame sequential transmission within a transmission opportunity (TXOP). More specifically, embodiments includes methods that enable multiple UL MU transmissions within a TXOP even when one or transmission errors occur.

Throughout this document, multi-user (MU) transmission refers to cases that multiple frames are transmitted to or from multiple stations simultaneously using different resources, wherein examples of different resources include different frequency resources in an OFDMA transmission and different spatial streams in a MU-MIMO transmission. An MU transmission can include any of a DL OFDMA transmission, a DL MU-MIMO transmission, an UL OFDMA transmission, an UL MU-MIMO transmission, and the like.

Figure 11A:
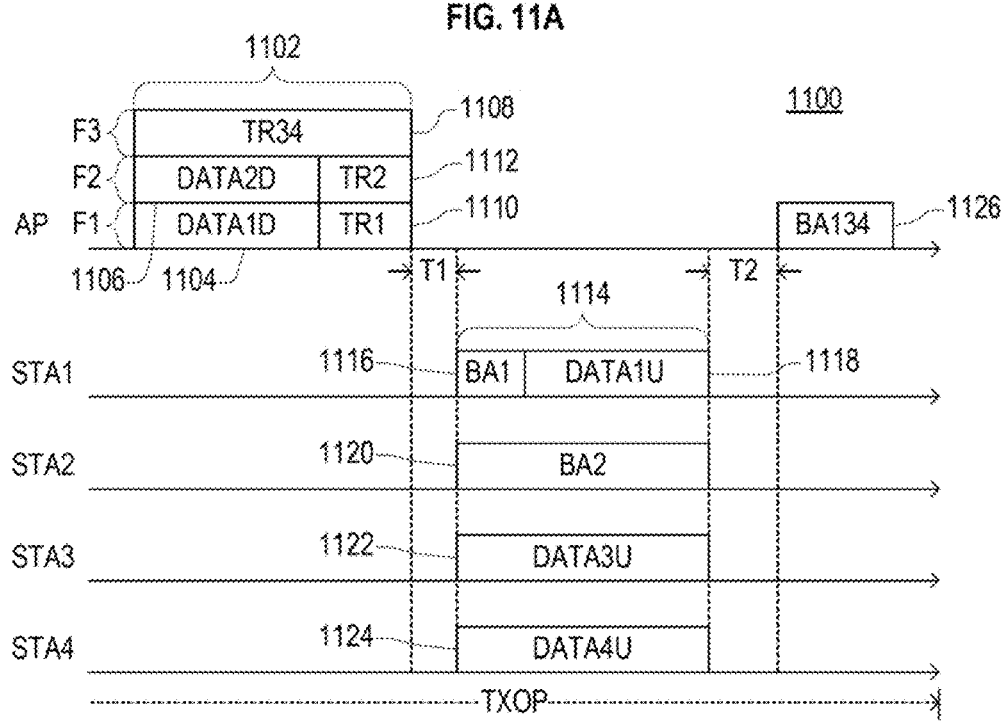
FIG. 11A illustrates an operation in which DL MU and Up-Link (UL) MU transmissions are combined in a cascaded manner.

FIG. 11A illustrates an example operation 1100 in which a DL MU transmission and a UL MU transmission are combined together in a cascaded manner according to an embodiment The operation 1100 is performed within an EDCA transmission opportunity (TXOP) by an AP and first, second, third, and fourth stations STA1, STA2, STA3, and STA4. At the beginning of the operation 1100, the AP has first and second data DATA1D and DATA2D to send to stations STA1 and STA2, respectively. In addition, the AP schedules uplink data frame transmission from stations STA1, STA3, and STA4.

Each of the frames illustrated in FIG. 11A may include preambles, such a Very High Throughput (VHT) preamble or a High Efficiency (HE) preamble, that are omitted in order to more clearly and concisely illustrate the operation 1100.

The AP transmits a DL MU frame 1102 comprising first, second, and third frames F1, F2, and F3. In an embodiment, the frames F1, F2, and F3 respectively correspond to three resource allocations of an OFDMA transmission. In another embodiment, the frames F1, F2, and F3 respectively correspond to three spatial streams of a MU-MIMO transmission. In another embodiment, the frames F1, F2, and F3 may each correspond to a resource allocation of an OFDMA transmission or to a spatial stream of a MU-MIMO transmission using an allocated resource of the OFDMA transmission.

The first frame F1 is targeted to the first station STA1 and comprises first and second A-MPDU subframes 1104 and 1110. The first subframe 1104 is a DL data frame including the first data DATA1D. The second subframe 1110 is a unicast first trigger frame TR1 that solicits a UL frame transmission as an immediate response to the DL MU frame 1102.

The second frame F2 is targeted to the second station STA2 and comprises first and second A-MPDU subframes 1106 and 1112. The first subframe 1106 is a DL data frame including the second data DATA2D. The second subframe 1112 is a unicast second trigger frame TR2 that solicits an UL frame transmission as an immediate response to the DL MU frame 1102.

The third frame F3 includes a broadcast third trigger frame 1108 (TR34) that targets the third station STA3 and the fourth station STA4, and solicits UL data frame transmissions as immediate responses to the DL MU frame 1102.

The stations STA1, STA2, STA3, and STA4 each successfully receive the DL MU frame 1102.

Because the DL MU frame 1102 includes the first, second, and third trigger frames targeting the stations STA1, STA2, and STA3 and STA4, respectively, a first predetermined time T1 after receiving the DL MU frame 1102, the stations STA1, STA2, STA3, and STA4 each send UL MU frames as an immediate response to the respective trigger frame included in the DL MU transmission. In an embodiment, the UL frames respectively correspond to resource allocations of an OFDMA transmission. In another embodiment, the UL frames respectively correspond to spatial streams of a MU-MIMO transmission. In another embodiment, the UL frames may each correspond to a resource allocation of an OFDMA transmission or to a spatial stream of a MU-MIMO transmission using an allocated resource of the OFDMA transmission.

The first station STA1 transmits a UL A-MPDU 1114 in response to the first trigger frame 1110 that comprises i) an acknowledgement frame 1116 (BA1) in response to DL data frame 1104, and ii) a first UL data frame 1118. The first UL data frame 1118 includes first UL data DATA1U.

The second station STA2 transmits an acknowledgement frame 1120 (BA2) in response to DL data frame 1106. However, because the second station STA2 does not have any data queued for transmission, the second station STA2 does not send an UL data frame in response to the second trigger frame 1112.

The third station STA3 transmits a second UL data frame 1122 in response to the third trigger frame 1108. The UL data frame 1122 includes second UL data DATA3U.

The fourth station STA4 transmits a third UL data frame 1124 in response to the third trigger frame 1108. The UL data frame 1124 includes third UL data DATA4U.

A second predetermined time T2 after receiving the UL MU frames 1114, 1120, 1122, and 1124 sent from the stations STA1, STA2, and STA3 and STA4, respectively, the AP transmits acknowledgement frame 1126 (BA134) to the first, third, and fourth stations STA1, STA3, and STA4. The acknowledgement frame 1126 is a response to the first, second, and third UL data frames 1118, 1122, and 1124.

The cascaded DL/UL MU transmission operation 1100 of FIG. 11A works properly if performed according to an IEEE Std 802.11n or IEEE Std 802.11ac protocol when no transmission errors occur. However, the operation 1100 performed according to an IEEE Std 802.11n or IEEE Std 802.11ac protocol does not work as intended when a transmission error occurs.

Figure 11B:
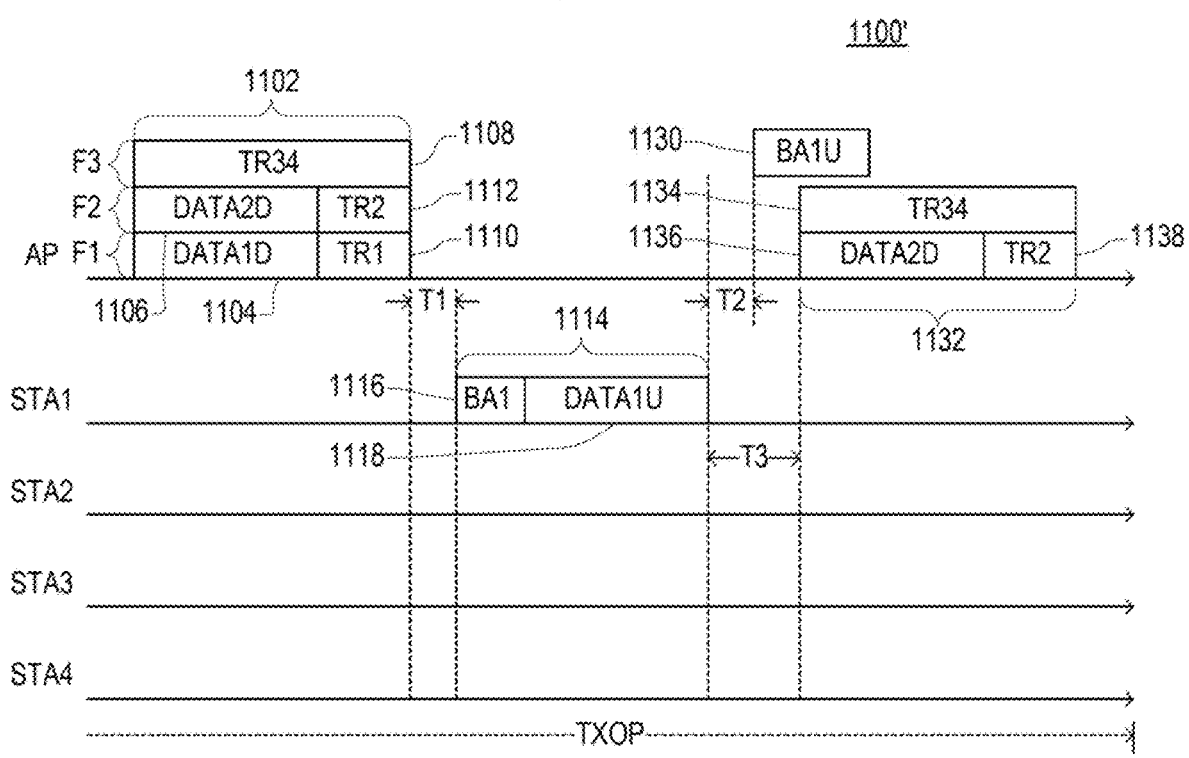
FIG. 11B illustrates a cascaded DL/UL MU transmission operation in which a transmission error occurs.

FIG. 11B illustrates a cascaded DL/UL MU transmission operation 1100' performed within an EDCA transmission opportunity TXOP. The operation 1100' differs from the operation 1100 of FIG. 11A in that a transmission error occurs during the operation 1100'.

At the beginning of the operation 1100', the AP has first and second data DATA1D and DATA2D to send to stations STA1 and STA2, respectively. In addition, the AP schedules uplink data frame transmission from stations STA1, STA3, and STA4.

Each of the frames illustrated in FIG. 11B may include preambles, such a Very High Throughput (VHT) preamble or a High Efficiency (HE) preamble, that are omitted in order to more clearly and concisely illustrate the operation 1100'.

The AP transmits a DL MU frame 1102 comprising first, second, and third frames F1, F2, and F3. In an embodiment, the three frames respectively correspond to three resource allocations of an OFDMA transmission. In another embodiment, the three frames respectively correspond to three spatial streams of a MU-MIMO transmission.

The first frame F1 is targeted to the first station STA1 and comprises first and second A-MPDU subframes 1104 and 1110. The first subframe 1104 is a DL data frame including the first data DATA1D. The second subframe 1110 is a unicast first trigger frame TR1 that solicits a UL frame transmission as an immediate response to the DL MU frame 1102.

The second frame F2 is targeted to the second station STA2 and comprises third and fourth A-MPDU subframes 1106 and 1112. The third subframe 1106 is a DL data frame including the second data DATA2D. The fourth subframe 1112 is a unicast second trigger frame TR2 that solicits an UL frame transmission as an immediate response to the DL MU frame 1102.

The third frame F3 includes a broadcast third trigger frame 1108 (TR34) that targets the stations STA3 and STA4, and solicits UL data frame transmissions as immediate responses to the DL MU frame 1102.

The first station STA1 successfully receives the DL MU frame 1102. Because of a transmission error (such as interference in the wireless medium), the second, third, and fourth stations STA2, STA3, and STA4, each do not successfully receives the DL MU frame 1102.

Because the DL MU frame 1102 includes the first trigger frame 1110 targeting the first station STA1, a first predetermined time T1 after receiving the DL MU frame 1102, the STA1 transmits an UL A-MPDU 1114 in response to the first trigger frame 1110 that comprises i) an acknowledgement frame 1116 (BA1) in response to DL data frame 1104, and ii) an UL data frame 1118. The UL data frame 1118 includes UL data DATA1U.

The second, third, and fourth stations STA2, STA3, and STA4 do not send any frames in response to the DL MU frame 1102.

The AP successfully receives the UL A-MPDU 1114 from the STA1. Based on the IEEE 802.11n or 802.11ac protocol, the AP may need to react differently for different responses and lack of responses from different stations.

For the UL data frame 1118 transmitted by the STA1 and successfully received by the AP, the AP may transmit an acknowledgement frame 1130 (BA1U) in a second predetermined time T2 after receiving the UL data frame 1118.

For all other scheduled frame transmission to and from stations STA2, STA3, and STA4, which the AP does not receive correctly or did not receive an acknowledgment for, the AP may initiate a retransmission process. In a retransmission process according to the IEEE Std 802.11n or 802.11ac, the AP checks the wireless medium for a predetermined time T3 (for example, a PIFS) and retransmits the frames if a channel of the wireless medium stays idle for the predetermined time T3.

That is, in response to the transmission error, the AP may transmit a DL MU frame 1132 including i) a retransmitted DL data subframe 1136 including the second data DATA2D that was unsuccessfully transmitted in the third subframe 1106 of the DL MU frame 1102, ii) a retransmitted subframe 1138 including the unicast second trigger frame TR2 that was unsuccessfully transmitted in the fourth subframe 1112 of the DL MU frame 1102, and iii) a retransmitted frame 1134 including the broadcast third trigger frame TR34 that was unsuccessfully transmitted in the third frame 1108 of the DL MU frame 1102.

As shown in FIG. 11B, because of the differences in the actions the AP takes in response to the different results from the different stations, the AP cannot respond properly under the IEEE Std 802.11n or 802.11ac protocols.

Embodiments of the present disclosure include error handling processes that overcome the issues illustrated in FIG. 11B. In an embodiment, when an AP includes, in a DL MU transmission, one or more trigger frames that together target a more than one station, the frame exchanges by all the trigger frames are considered to be successful if the AP correctly receives an MPDU from at least one station indicated by any of the trigger frames.

Figure 12:
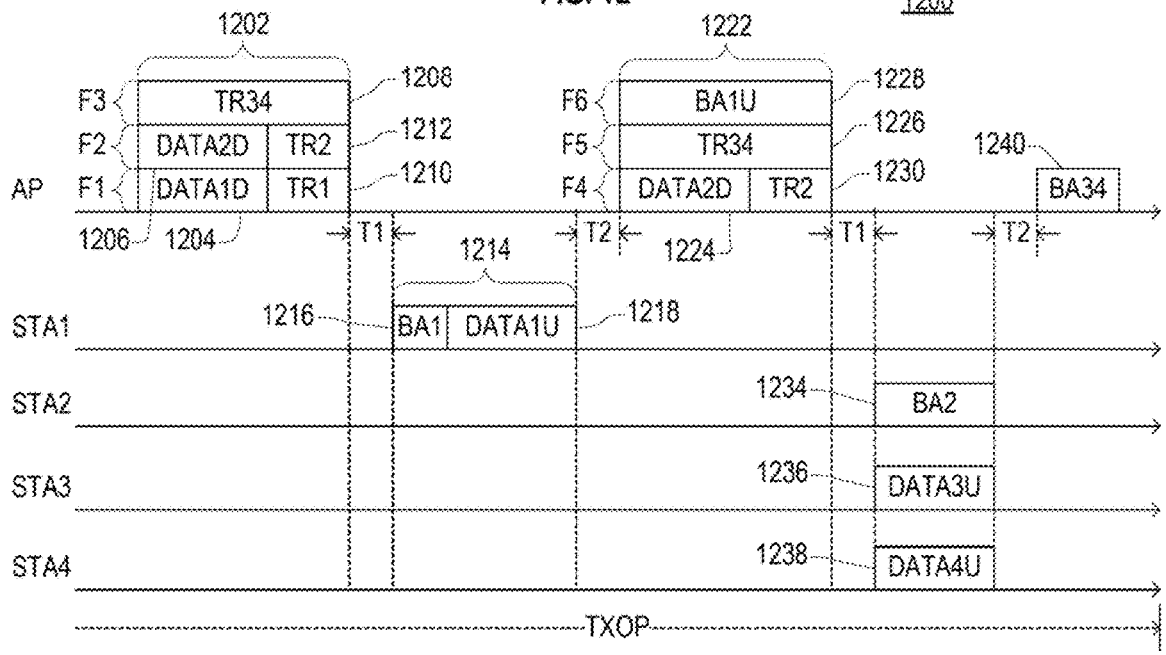
FIG. 12 illustrates a cascaded DL/UL MU transmission operation in which a transmission error occurs, according to an embodiment.

FIG. 12 illustrates a cascaded DL/UL MU transmission operation 1200 according to an embodiment. The operation 1200 is performed within an EDCA transmission opportunity TXOP. The operation 1200 differs from the operation 1100' of FIG. 11B in that an error handling process of an embodiment is used instead of an error handling process of the IEEE 802.11n or 802.11ac standards.

At the beginning of the operation 1200, the AP has first and second data DATA1D and DATA2D to send to first and second stations STA1 and STA2, respectively. In addition, the AP schedules uplink data frame transmission from first, third, and fourth stations STA1, STA3, and STA4.

Each of the frames illustrated in FIG. 12 may include preambles, such as a Very High Throughput (VHT) preamble or a High Efficiency (HE) preamble, that are omitted in order to more clearly and concisely illustrate the operation 1200.

The AP transmits a first DL MU frame 1202 comprising first, second, and third frames F1, F2, and F3. In an embodiment, the three frames respectively correspond to three resource allocations of an OFDMA transmission. In another embodiment, the three frames respectively correspond to three spatial streams of a MIMO transmission. In another embodiment, the frames F1, F2, and F3 may each correspond to a resource allocation of an OFDMA transmission or to a spatial stream of a MU-MIMO transmission using an allocated resource of the OFDMA transmission.

The first frame F1 is targeted to the first station STA1 and comprises first and second A-MPDU subframes 1204 and 1210. The first subframe 1204 is a DL data frame including the first data DATA1D. The second subframe 1210 is a unicast first trigger frame TR1 that solicits a UL frame transmission as an immediate response to the first DL MU frame 1202.

The second frame F2 is targeted to the second station STA2 and comprises third and fourth A-MPDU subframes 1206 and 1212. The third subframe 1206 is a DL data frame including the second data DATA2D. The fourth subframe 1212 is a unicast second trigger frame TR2 that solicits an UL frame transmission as an immediate response to the first DL MU frame 1202.

The third frame F3 includes a broadcast third trigger frame 1208 (TR34) that targets the third and fourth stations STA3 and the STA4, and solicits UL data frame transmissions as immediate responses to the first DL MU frame 1202.

The first station STA1 successfully receives the first DL MU frame 1202. Because of a transmission error (such as interference in the wireless medium), the second, third, and fourth stations STA2, STA3, and STA4 each do not successfully receives the first DL MU frame 1202.

Because the first DL MU frame 1202 includes the first trigger frame TR1 targeting the first station STA1, a first predetermined time T1 after receiving the DL MU frame 1202, the first station STA1 transmits an UL A-MPDU 1214 in response to the first trigger frame 1210 that comprises i) a first acknowledgement frame 1216 (BA1) in response to DL data frame 1204, and ii) a first UL data frame 1218. The first UL data frame 1218 includes first UL data DATA1U.

The second, third, and fourth stations STA2, STA3, and STA4 do not send any frames in response to the DL MU frame 1202.

The AP successfully receives the UL A-MPDU 1214 from the first station STA1.

Because the AP transmitted one or more trigger frames (trigger frames TR1, TR2, and TR34) that together targeted more than one station, and the AP received a valid MPDU (here, the UL A-MPDU 1214) correctly from at least one station (here, the first station STA1) indicated by any of the trigger frames (TR1), the frame exchanges by all the trigger frames are considered to be successful, and as a result the AP can continue to transmit its next frames in a second predetermined time T2 without checking whether the wireless medium is idle.

However, even though the frame exchanges by all the trigger frames are considered to be successful, because the AP has not received an acknowledgment of the third A-MPDU subframe 1206 including the second DL data DATA2D in response to TR2 and has not received proper response frames to TR34, the AP schedules retransmission of the unsuccessfully transmitted frames together with an acknowledgement frame BA1U responsive to the first UL data frame 1218.

That is, the AP transmits a second DL MU frame 1222 comprising fourth, fifth, and sixth frames F4, F5, and F6 without first checking whether the wireless medium is idle. In an embodiment, the frames F4, F5, and F6 respectively correspond to three resource allocations of an OFDMA transmission. In another embodiment, the frames F4, F5, and F6 respectively correspond to three spatial streams of a MIMO transmission. In another embodiment, the frames F4, F5, and F6 may each correspond to a resource allocation of an OFDMA transmission or to a spatial stream of a MU-MIMO transmission using an allocated resource of the OFDMA transmission.

The fourth frame F4 is targeted to the second station STA2 and comprises fifth and sixth A-MPDU subframes 1224 and 1230. The fifth subframe 1224 is a DL data frame including a retransmission of the second data DATA2D. The sixth subframe 1212 is a unicast second trigger frame TR2 that solicits an UL frame transmission as an immediate response to the second DL MU frame 1222.

The fifth frame F5 includes the broadcast third trigger frame 1226 (TR34) that targets the third station STA3 and the fourth station STA4, and solicits UL data frame transmissions as immediate responses to the first DL MU frame 1222.

The sixth frame F6 includes a second acknowledgement frame 1228 (BA1U) sent to the first station STA1 in response to the first UL data frame 1218.

A first predetermined time T1 after receiving the second DL MU frame 1222, as the second, third, and fourth stations STA2, STA3, and STA4 all received a trigger frame that solicits an UL frame transmission, the second, third, and fourth stations STA2, STA3, and STA4 will send UL frames as an immediate response to the respective trigger frames, as detailed below.

The second station STA2 transmits a third acknowledgement frame 1234 (BA2) in response to DL data frame 1224. However, because the second station STA2 does not have any data queued for transmission, the second station STA2 does not send an UL data frame in response to the trigger frame 1230.

The third station STA3 transmits a second UL data frame 1236 in response to the third trigger frame TR34 in frame 1226. The second UL data frame 1236 includes second UL data DATA3U.

The fourth station STA4 transmits a third UL data frame 1238 in response to the third trigger frame TR34 in frame 1226. The third UL data frame 1238 includes third UL data DATA4U.

A second predetermined time T2 after receiving the UL MU frames 1234, 1236, and 1238 sent from the second, third, and fourth stations STA2, STA3, and STA4 respectively, the AP transmits acknowledgement frame 1240 (BA34) to the third and fourth stations STA3 and STA4. The acknowledgement frame 1240 is a response to the second and third UL data frames 1236 and 1238. In an embodiment, both the first predetermined time T1 and the second predetermined time T2 are a SIFS.

Figure 13:
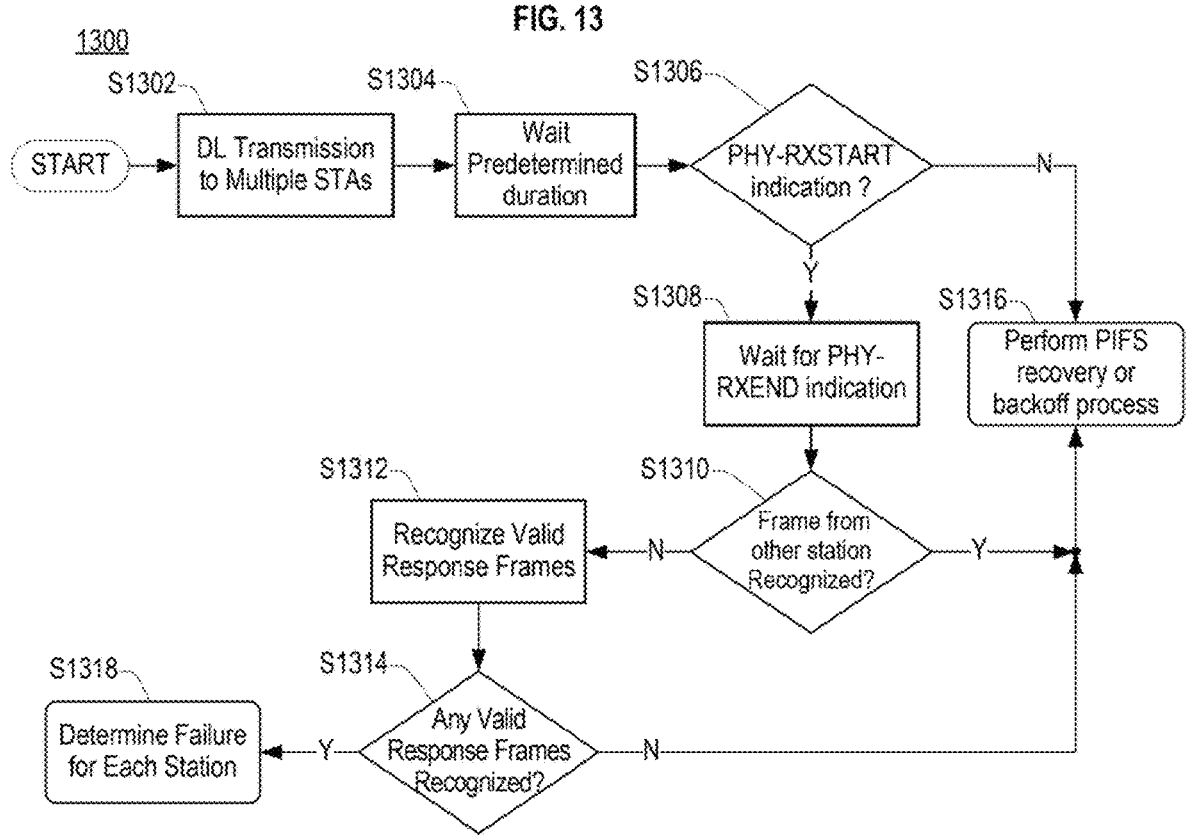
FIG. 13 illustrates a process for handling a transmission failure of a DL PPDU, according to an embodiment.

FIG. 13 illustrates a process 1300 for handling, by an AP, a transmission failure of a DL PPDU in an EDCA TXOP, according to an embodiment. The DL PPDU includes one or more trigger frames that i) when taken together are directed to a plurality of scheduled stations, and ii) each require one or more immediate response frames from one or more of the scheduled stations. The DL PPDU may be a DL MU PPDU. In an embodiment, the DL PPDU includes a plurality of trigger frames.

At S1302, the process 1300 transmits the trigger frames as part of a DL PPDU that is addressed to the scheduled stations. The trigger frames in the DL PPDU require, as an immediate response, the transmission of an UL MU PPDU by each of the scheduled stations.

At S1304, the process 1300 waits for a timeout interval of a predetermined duration starting at a PHY-TXEND.confirm primitive. In an embodiment, the predetermined duration is equal to a SIFS plus a slot time plus a PHY receive start delay (that is, aSIFSTime+aSlotTime+aPHY-RX-START-Delay).

At S1306, the process 1300 determines whether a PHY-RXSTART.indication primitive has occurred during the timeout interval. When the PHY-RXSTART.indication primitive did not occur during the timeout interval, the process 1300 determines that the transmission of the one or more trigger frames has failed and proceeds to S1316. Otherwise, at S1306 the process 1300 proceeds to S1308.

At S1308, the process 1300 waits for a PHY-RXEND.indication primitive corresponding to the PHY-RXSTART.indication primitive.

At S1310, the process 1300 determines whether any frame was received in a received UL MU PPDU corresponding to the PHY-RXSTART.indication and PHY-RXEND.indication primitives other than a valid response frame sent by the scheduled stations of the trigger frames or whether a transmission that was not identified or decoded was received in an interval corresponding to the PHY-RXEND.indication primitive and PHY-RXSTART.indication primitive. When the process 1300 determines that a frame other than the valid response frame from the scheduled stations or a transmission that was not identified or decoded was received, the process 1300 determines that the trigger frame transmission has failed and proceeds to S1316. Otherwise, at S1310 the process 1300 proceeds to S1312.

At S1312, the process 1300 recognizes valid response frames, sent by the scheduled stations respectively corresponding to the trigger frames, in the received UL MU PPDU corresponding to the PHY-RXSTART.indication and PHY-RXEND.indication primitives. The recognitions of the transmission failures of the trigger frames respectively sent to one or more recipient stations are individually determined for each recipient station.

At S1314, the process 1300 determines whether at least one valid response frame, sent by a scheduled station corresponding to one of the trigger frames, was received in the interval corresponding to the PHY-RXSTART.indication and PHY-RXEND.indication primitives. When the process 1300 determines that the at least one valid response frame was received, the process 1300 proceeds to S1318. Otherwise, at S1314 the process 1300 determines that the trigger frame transmission has failed and proceeds to S1316.

At S1316, in response to the transmission failure of the trigger frames, the process 1300 may perform a PIFS recovery or perform a backoff within a TXOP.

At S1318, the process 1300 respectively determines for each recipient station requiring an individual immediate response frame whether a transmission failures of the trigger frame addressed to the recipient station has occurred.

FIG. 14 illustrates a process 1400 for handling, by an AP, a transmission failure of a DL MU PPDU in an EDCA TXOP, according to another embodiment. The DL PPDU includes one or more trigger frames that i) when taken together are directed to a plurality of scheduled stations, and ii) each require one or more immediate response frames from one or more of the scheduled stations. In an embodiment, the DL PPDU includes a plurality of trigger frames. In an embodiment, the DL MU PPDU is an initial frame of the TXOP.

At S1402, the process 1400 transmits the one or more trigger frames as part of a DL MU PPDU that is addressed to the scheduled stations. The trigger frames in the DL PPDU require, as an immediate response, the transmission of an UL MU PPDU as an immediate response by each of the scheduled stations.

At S1404, the process 1340 waits for a timeout interval of a predetermined duration starting at a PHY-TXEND.confirm primitive. In an embodiment, the predetermined duration is equal to a SIFS plus a slot time plus a PHY receive start delay (that is, aSIFSTime+aSlotTime+aPHY-RX-START-Delay).

At S1406, the process 1400 determines whether a PHY-RXSTART.indication primitive has occurred during the timeout interval. When the PHY-RXSTART.indication primitive did not occur during the timeout interval, the process 1400 determines that the transmission of the trigger frames has failed and proceeds to S1416. Otherwise, at S1406 the process 1400 proceeds to S1408.

At S1408, the process 1400 waits for a PHY-RXEND.indication primitive corresponding to the PHY-RXSTART.indication primitive.

At S1410, the process 1400 determines whether any frame was received in a received UL MU PPDU corresponding to the PHY-RXSTART.indication and PHY-RXEND-.indication primitives other than a valid response frame sent by the one or more scheduled stations of the trigger frames, or whether a transmission that was not identified or decoded was received in the interval corresponding to the PHY-RXEND.indication primitive and PHY-RXSTART.indication primitive. When the process 1400 determines that a frame other than the valid response frame from one of the scheduled stations or a transmission that was not identified or decoded was received, the process 1400 determines that the trigger frames transmission has failed and proceeds to S1416. Otherwise, at S1410 the process 1400 proceeds to S1418.

At S1412, the process 1400 recognizes valid response frames, sent by the one or more scheduled stations respectively corresponding to the trigger frames, in the received UL MU PPDU corresponding to the PHY-RXSTART.indication and PHY-RXEND.indication primitives.

At S1414, the process 1400 determines whether at least one valid response frame, sent by a scheduled station corresponding to one of the trigger frames, was received in the interval corresponding to the PHY-RXSTART.indication and PHY-RXEND.indication primitives. When the process 1400 determines that the at least one valid response frame was received, the process 1400 proceeds to S1418. Otherwise, at S1414 the process 1400 determines that the trigger frame transmission has failed and proceeds to S1416.

At S1416, in response to the transmission failure of the trigger frames, the process 1400 may perform a PIFS recovery or perform a backoff within a TXOP.

At S1418, the process 1400 determines whether there was a failure of the transmission of any of the trigger frames, that is, whether not all of the expected response frames respectively corresponding to trigger frames where recognized as valid at S1410. When all of the expected response frames for the DL MU PPDU were recognized as valid at S1410, the process 1400 ends. Otherwise, at S1418 the process 1400 proceeds to S1420.

At S1420, after a valid response to the DL MU PPDU, when a duration of a next transmission plus the duration of any expected acknowledgment and applicable IFS is less than the remaining TXNAV timer value, the process 1400 proceeds to S1422. Otherwise, at S1420 the process 1400 ends.

At S1422, the process 1400 waits a predetermined duration, such as a SIFS. The process 1400 then proceeds to S1424.

At S1424, the process 1400 may transmit, using a corresponding channel access function, the next transmission. The next transmission may include retransmissions of one or more trigger frames transmitted in the DL MU PPDU for which respective valid response frames were not received.

In an embodiment of the invention, a process of transmitting frames from a station is disclosed, wherein the process includes transmitting DL frames in MU transmission manner. The DL frames include a first DL frame and a second DL frame. The first DL frame solicits a first UL response frame from a first station as an immediate response. The second DL frame solicits a second UL response frame from a second station as an immediate response.

The process receives the first UL response frame without receiving the second UL response frame in a first predetermined time after transmitting the DL frames.

The process transmits a third DL frame in a second predetermined time after receiving the first response frame without checking the wireless medium status. The third DL frame solicits the second response frame from the second station.

The first predetermined time may be a SIFS. The second predetermined time may be the SIFS.

The first frame and the second frame may be UL trigger frames, that is, trigger frames that solicit respective immediate UL responses.

Embodiments enable an AP to utilize a wireless medium more efficiently even when not all response for multiple trigger frames are received correctly. Embodiments may operate to reduce the chance of a backoff or PIFS recovery process being performed, which can increase overall system throughput.

Embodiments include a process used by an AP to perform a triggered UL transmission in which an AP transmits one or more trigger frames in a DL MU transmission. The AP allocates resources to an UL transmission that is to be sent as an immediate response to a DL PPDU of the DL MU transmission. The process shall not allocate a resource to the UL transmission in any 20 MHz channel that is not occupied by the DL PPDU, that is, all resources allocated to the UL transmission are in 20 MHz channels that were occupied in the DL PPDU. Furthermore, in some embodiments, each 20 MHz channel occupied by the DL PPDU, there is at least one resource allocated to the UL transmission.

Embodiments enable flexible resource assignment for a UL MU transmission. More specifically, some embodiments enable allocating resources for the UL MU transmission that are solicited by a plural number of simultaneous trigger frames that precedes the UL MU transmission.

FIG. 15 illustrates an operation 1500 of an UL MU transmission. In FIG. 15, as well as in FIGS. 16-22, a vertical axis (f) indicates frequency and a horizontal axis (t) indicates time.

FIG. 15 and FIGS. 16-22 illustrate UL transmissions and DL transmissions, such as DL transmission 1502 and a UL MU transmission 1510 of FIG. 15. The figures illustrate payload portions included in the respective transmissions. Each of the transmissions also includes a preamble portion, not shown in the figure, which may occupy the entirety of any 20 MHz channel used, in whole or in part, by the payload of the transmission. In the description below, unless otherwise indicated, a bandwidth used by a transmission refers to a bandwidth used by a payload portion of the transmission, which bandwidth may be the same as or a subset of a bandwidth used by a preamble of the transmission.

An AP schedules UL MU transmissions from a first station STA1 and a second station STA2 simultaneously. For this purpose, the AP first sends the DL transmission 1502 including a trigger frame 1504 (TRIG) that solicits the UL MU transmission using a 40 MHz channel bandwidth, the 40 MHz channel bandwidth including upper and lower 20 MHz channels. The trigger frame 1504 may include resource allocation information for the UL MU transmission. In FIG. 15, the trigger frame 1504 indicates that the response of the first station STA1 will occupy the an upper 20 MHz channel resource of a UL MU transmission 1510 and the response of the second station STA2 will occupy a lower 20 MHz channel resource of the UL MU transmission 1510. In an embodiment, the DL transmission 1502 is a DL MU transmission 1502.

A first predetermined time T1 after receiving the trigger frame 1504, the first station STA1 and second station STA2 respectively transmit first UL MU frame 1512 (DATA1) and second UL MU frame 1514 (DATA2) as immediate responses to the trigger frame 1504. The first UL MU frame 1512 and the second UL MU frame 1514 are components of the UL MU transmission 1510. The first station STA1 and the second station STA2 transmit using the respective designated resources, that is, the first station STA1 transmits using the upper 20 MHz bandwidth, and the second station STA2 transmits using the lower 20 MHz bandwidth.

A second predetermined time T2 after receiving the UL MU frames 1512 and 1514, the AP sends back an acknowledgement frame 1520 (BA) to the first station STA1 and the second station STA2.

In a UL MU transmission mechanism according to one embodiment, an AP shall not allocate an UL subchannel in any 20 MHz channel that is not occupied by the trigger frame, and in each 20 MHz channel occupied by the trigger frame, there is at least one allocated subchannel for UL transmission. Therefore, in the previous example, the AP cannot allocate resource that is outside of the upper and lower 20 MHz bandwidth because the trigger frame occupies the upper and lower 20 MHz channel.

The above mentioned restriction on the transmission bandwidth of the UL MU frame is reasonable because the transmission bandwidth of a response frame needs to be the same or smaller than the transmission bandwidth of a corresponding soliciting frame. However, the above mentioned restriction may not work as intended when a plural number of trigger frames are transmitted simultaneously, or when a trigger frame directed to a plurality of stations and a non-trigger DL frame are transmitted simultaneously (e.g., in the same DL PPDU).

Figure 16:
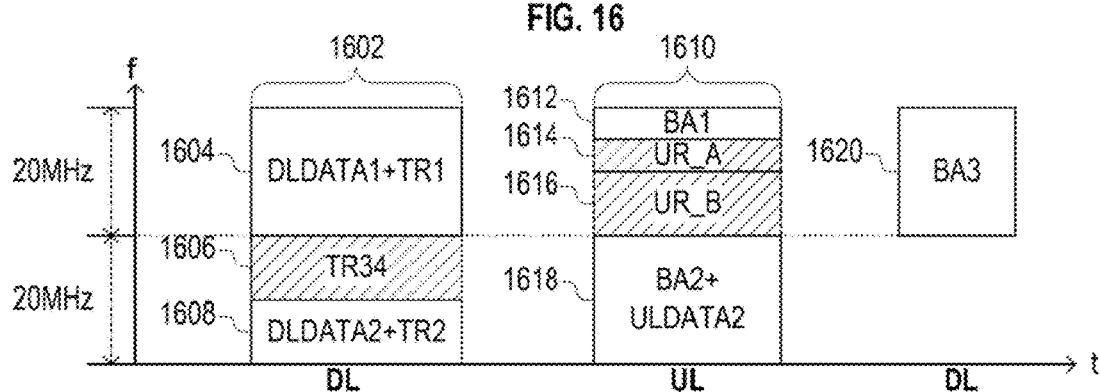
FIG. 16 illustrates allocation issues that may arise under the IEEE 802.11n and 802.11ac standards.

FIG. 16 illustrates issues that may arise under the above mentioned rules. In FIG. 16, an AP transmits a first DL A-MPDU 1604 including a first data frame DLDATA1 for a first station STA1 and a second DL A-MPDU 1608 including a second DL data frame DLDATA2 to the second station STA2. The DL A-MPDUs 1604 and 1608 are transmitted simultaneously as part of a DL MU transmission 1602. The AP schedules an upper 20 MHz bandwidth for the transmission of the first DL A-MPDU 1604 to the first station STA1, and schedules a lower 10 MHz bandwidth for the transmission of the second DL A-MPDU 1608 to the second station STA2.

The AP also includes a first unicast trigger frame TR1 that solicits an UL MU transmission in the first DL A-MPDU 1604 sent to the first station STA1, and includes a second unicast trigger frame TR2 that solicits an UL MU transmission in the second DL A-MPDU 1608 sent to the second station STA2.

The first station STA1 will transmit a first acknowledgement frame BA1 to the received first DL data frame DL DATA1. The second station STA2 will transmit a second acknowledgement frame BA2 to the received second DL data frame DL DATA2. For this purpose, the AP schedules a 5 MHz portion 1612 in the upper 20 MHz bandwidth of an UL MU transmission 1610 for a UL transmission by the first station STA1 and schedules the entire lower 20 MHz bandwidth 1618 of the UL MU transmission 1610 for a UL transmission by the second station STA2. The respective resource assignment for the UL transmissions of the first station STA1 and second station STA2 satisfies the above mentioned rules because the resource for the first acknowledgement frame BA1 is occupied by the first unicast trigger frame TR1, and the resources for the second acknowledgement frame BA2 and a UL data frame ULDATA2 are occupied for 20 MHz that is occupied by the second unicast trigger frame TR2.

In response to receiving the UL data frame ULDATA2 included in the UL MU transmission 1610, the AP transmits a third acknowledgment frame 1620 (BA3).

However, when the AP intends to assign first and second unused resources 1614 and 1616 (UR_A and UR_B) of the UL MU transmission 1610 to other stations, such as a third station STA3 and a fourth station STA4, by sending a broadcast trigger frame TR34 in a third DL A-MPDU 1606 included in the DL MU transmission 1602, this allocation cannot meet the requirements of the above mentioned rule because resources for the first and second unused resources 1614 and 1616 are not using 20 MHz channel that the broadcast trigger frame TR34 occupies. Therefore, wireless channel may not be fully utilized if the above mentioned rules are applied when there are a plurality of trigger frames in the DL MU transmission 1602.

To overcome the issues mentioned above, embodiments of the present disclosure include processes for controlling transmission bandwidth for an UL MU transmission. The UL MU transmission may be an UL MU PPDU.

In embodiments, when an AP transmits one or more trigger frames in a DL MU transmission, the AP shall not allocate a UL subchannel in any 20 MHz channel that is not occupied by a preceding or soliciting DL PPDU. The preceding DL PPDU may be an immediately preceding DL PPDU. The preceding DL PPDU may be the DL MU transmission. Furthermore, in each 20 MHz channel occupied by the preceding or soliciting DL PPDU, there is at least one allocated subchannel for a UL transmission.

In embodiments, the UL MU transmission includes all UL MPDUs/A-MPDUs that are scheduled together, and a DL MU PPDU includes all DL MPDUs/A-MPDUs that are scheduled together.

In an embodiment, an AP may allocate an UL subchannel in any 20 MHz channel that is not occupied by the trigger frame as long as the total transmission bandwidth of the UL MU PPDU is equal to or smaller than that of the DL PPDU that solicits the UL MU PPDU.

In another embodiment, the AP is allowed to not allocate an UL subchannel corresponding to any subchannel in any 20 MHz channel occupied by a trigger frame, as long as at least one subchannel is allocated in each 20 MHz channel within the transmission bandwidth of the UL MU PPDU.

Figure 17:
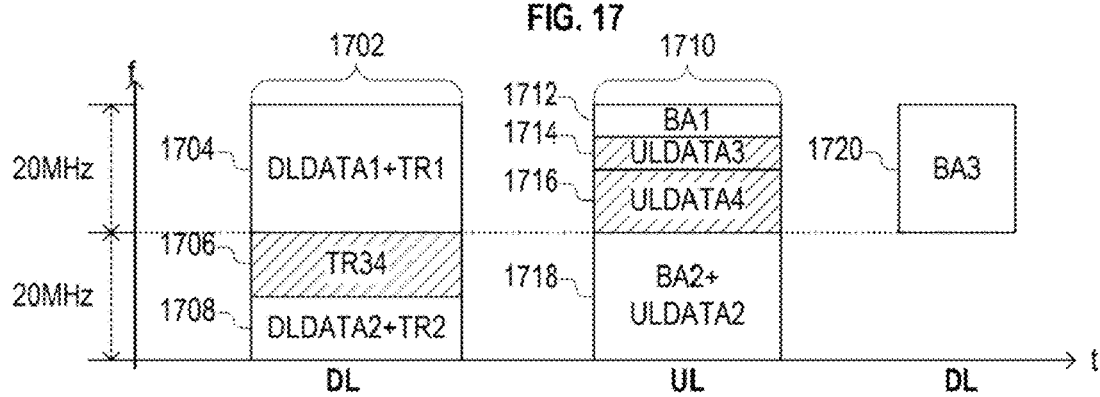
FIG. 17 illustrates an allocation according to an embodiment.

FIG. 17 illustrates a bandwidth allocation according to an embodiment. Similarly to in FIG. 16, an AP transmits a first DL A-MPDU 1704 including a first data frame DLDATA1 to a first station STA1 and transmits a second DL A-MPDU 1708 including a second DL data frame DLDATA2 to a second station STA2. The DL A-MPDUs 1704 and 1708 are transmitted simultaneously as part of a DL MU transmission 1702.

The AP schedules an upper 20 MHz bandwidth for the transmission of the first DL A-MPDU 1704 to the first station STA1, and schedules a lower 10 MHz bandwidth of a lower 20 MHz bandwidth for the transmission of the second DL A-MPDU 1708 to the second station STA2.

The AP includes a first unicast trigger frame TR1 that solicits an UL MU transmission in the first DL A-MPDU 1704 sent to the first station STA1, and includes a second unicast trigger frame TR2 that solicits an UL MU transmission in the second DL A-MPDU 1708 sent to the second station STA2.

The AP also transmits, simultaneously as part of the DL MU transmission 1702, a third DL MPDU 1706 including a broadcast trigger frame TR34 that solicits an UL MU transmission from a third station STA3 and a fourth station STA4. The AP schedules an upper 10 MHz bandwidth of the lower 20 MHz bandwidth for the transmission of the third DL MPDU 1706.

As used herein, trigger information may be represented/included in a MAC header of an MPDU of a DL MU transmission or in a payload of the MPDU. For example, in an embodiment, the DL MU transmission 1702 may solicit one or more of the UL MU transmissions from the stations STA1, STA2, STA3, and STA4 using trigger information included in a MAC header of an MPDU of the DL MU transmission 1702. In an embodiment, the DL MU transmission 1702 may solicit one or more of the UL MU transmissions from the stations STA1, STA2, STA3, and STA4 using a trigger frame represented in an MPDU of the DL MU transmission 1702.

The AP schedules the solicited UL transmission so that the allocated resources for the UL transmission of stations STA1, STA3, and STA4 are within an upper 20 MHz bandwidth of an UL MU transmission 1710, and the allocated resources for the UL transmission of the second station STA2 are within a lower 20 MHz bandwidth of the UL MU transmission 1710.

Scheduling information for the UL MU transmission 1710 is delivered by the three trigger frames in the DL MU transmission 1702. The first station STA1 receives all or part of the scheduling information in the unicast trigger frame TR1. The second station STA2 receives all or part of the scheduling information in the unicast trigger frame TR2. The third station STA3 and the fourth station STA4 receive all or part of the scheduling information in broadcast trigger frame TR34.

The AP may allocate an upper 5 MHz bandwidth 1712 of an upper 10 MHz of an upper 20 MHz bandwidth of the UL MU transmission 1710 to the UL response BA1 from the first station STA1 corresponding to the unicast trigger frame TR1, and may allocate a lower 20 MHz bandwidth 1718 of the UL MU transmission 1710 to the UL response BA2+ULDATA4 from the second station STA2 corresponding to the unicast trigger frame TR2.

In an embodiment, because the total transmission bandwidth of the UL MU transmission 1710 is the same with that of the DL MU transmission 1702, the allocated bandwidth in the UL MU transmission 1710 of UL transmissions for third station STA3 and fourth station STA4 can be outside of an occupied bandwidth of the broadcast trigger frame TR34. Moreover, no allocation of a subchannel for a UL response corresponding to the broadcast trigger frame TR34 is allowed in the 20 MHz channel in which the broadcast trigger frame TR34 was transmitted because the allocated resources for the UL transmission of the second station STA2 include the entire lower 20 MHz bandwidth of the UL MU transmission 1710. As a result, the resources allocated to the UL responses corresponding to the broadcast trigger frame TR34 are allocated in the upper 20 MHz bandwidth of the UL MU transmission 1710.

Specifically, in the embodiment, the AP may allocate a lower 5 MHz bandwidth 1714 of an upper 10 MHz of an upper 20 MHz bandwidth of the UL MU transmission 1710 to the UL response ULDATA3 from the third station STA3 corresponding to the broadcast trigger frame TR34, and may allocate a lower 10 MHz bandwidth 1716 of the upper 20 MHz bandwidth of the UL MU transmission 1710 to the UL response ULDATA4 from the fourth station STA4 corresponding to the broadcast trigger frame TR34. This demonstrates the additional flexibility of resource assignment and improved overall wireless medium efficiency of the embodiment.

In response to receiving the UL data frames ULDATA2, ULDATA3, and ULDATA4 included in the UL MU transmission 1710, the AP transmits a third acknowledgment frame 1720 (BA3).

Figure 18:
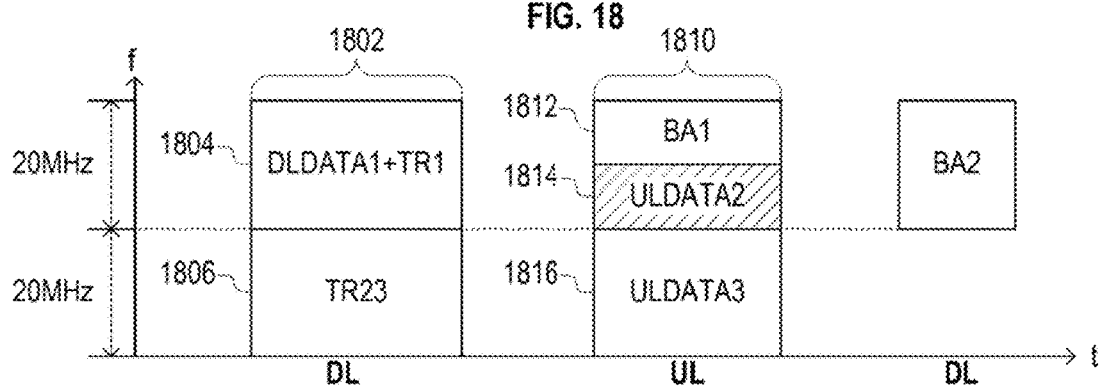
FIG. 18 illustrates another allocation according to an embodiment.

FIG. 18 illustrates another example of bandwidth allocation according to an embodiment. In FIG. 18, an AP transmits, simultaneously as part of a DL MU transmission 1802, i) a first DL A-MPDU 1804 including a DL data frame DLDATA1 and a unicast trigger Frame TR1 to a first station STA1 and ii) a second DL MPDU 1806 including a broadcast trigger frame TR23 to second and third stations STA2 and STA3.

A scheduled UL frame BA1 for the first station STA1 in an UL MU transmission 1810 is allocated resources within a same 20 MHz bandwidth as that of the soliciting trigger frame TR1 sent to the first station STA1. Specifically, the scheduled UL frame BA1 is allocated an upper 10 MHz bandwidth 1812 of the same upper 20 MHz bandwidth occupied by the soliciting trigger frame TR1.

However, the scheduled UL frames responsive to the broadcast trigger frame TR23 (first UL data frame ULDATA2 from the second station STA2 and second UL data frame ULDATA3 from the third station STA3) are together allocated resources from a bandwidth larger than that of the soliciting trigger frame TR23. Furthermore, while the second UL data frame ULDATA3 occupies the same lower 20 MHz bandwidth 1816 that corresponds to the lower 20 MHz bandwidth occupied by the soliciting trigger frame TR23, the first UL data frame ULDATA2 occupies bandwidth outside of 20 MHz channel that was occupied by the trigger frame TR23. Specifically, the first UL data frame ULDATA2 occupies a lower 10 MHz bandwidth 1814 of the upper 20 MHz bandwidth of the UL MU transmission 1810.

Figure 19:
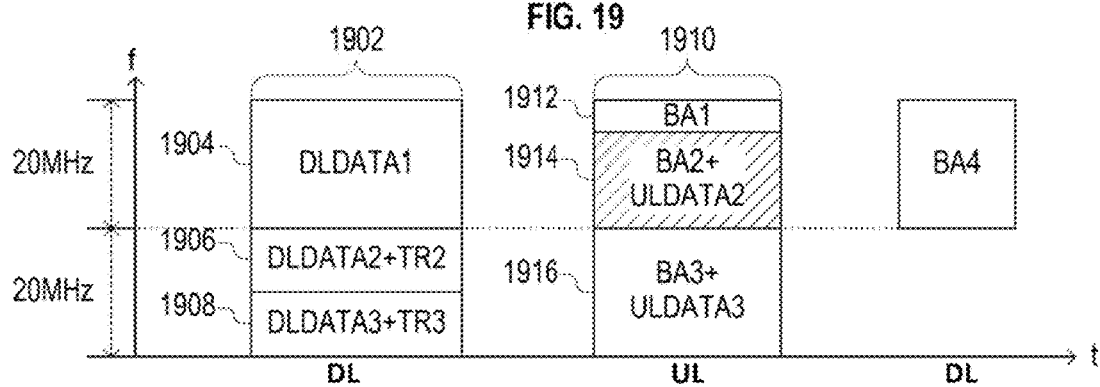
FIG. 19 illustrates another allocation according to an embodiment.

FIG. 19 illustrates another example of bandwidth allocation according to an embodiment. In FIG. 19, an AP transmits DL data frames DLDATA1, DLDATA2, and DLDATA3, respectively, to stations STA1, STA2, and STA3 simultaneously in a DL MU transmission 1902. The AP also schedules respective UL MU transmissions from the second station STA2 and the third station STA3, and this information is indicated to the second and third stations STA2 and STA3 by sending unicast trigger frames TR2 and TR3, respectively, to the second and third stations STA2 and STA3.

The first DL data frame DLDATA1 is transmitted using an upper 20 MHz bandwidth 1904 of the DL MU transmission 1902. The second DL data frame DLDATA2 and the first trigger frame TR2 are transmitted using an upper 10 MHz bandwidth 1906 of a lower 20 MHz bandwidth of the DL MU transmission 1902. The third DL data frame DLDATA3 and the second trigger frame TR3 are transmitted using a lower 10 MHz bandwidth 1908 of the lower 20 MHz bandwidth of the DL MU transmission 1902.

The scheduled resource for second station STA2's UL transmission occupies bandwidth outside of 20 MHz channel that is occupied by any of the trigger frames TR2 and TR3 but is still within the transmission bandwidth of preceding DL MU transmission 1902.

Specifically, an upper 5 MHz bandwidth 1912 of an upper 20 MHz bandwidth of an UL MU transmission 1910 is allocated to an UL response BA1 of the first station STA1, which is transmitted in response to trigger information included in the first DL data frame DLDATA1. A lower 15 MHz bandwidth 1914 of the upper 20 MHz bandwidth of the UL MU transmission 1910 is allocated to an UL response BA2+ULDATA2 of the second station STA2, and a lower 20 MHz bandwidth 1916 of the UL MU transmission 1910 is allocated to an UL response BA3+ULDATA3 of the third station STA3.

Figure 20:
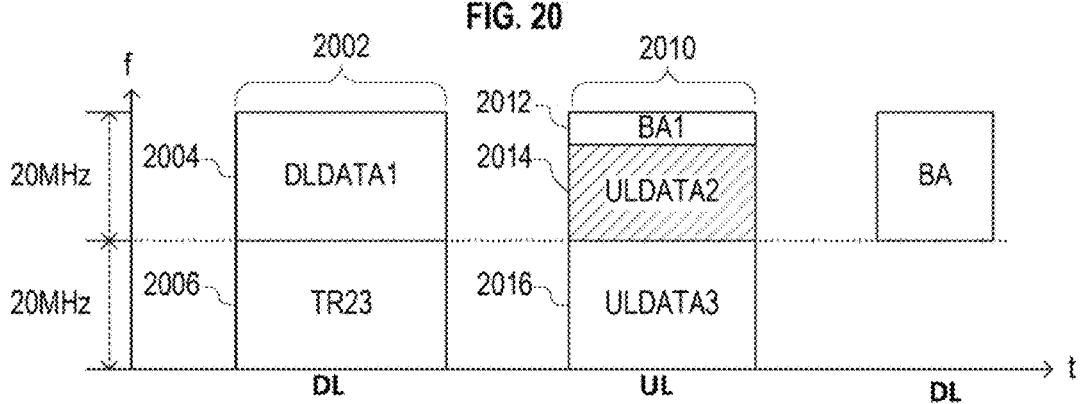
FIG. 20 illustrates another allocation according to an embodiment.

FIG. 20 illustrates another example of bandwidth allocation according to an embodiment. In FIG. 20, an AP transmits DL data frame DLDATA1 to a first station STA1 in a DL MU transmission 2002. The AP also schedules respective UL MU transmissions from the second station STA2 and the third station STA3, and this information is indicated to the second station STA2 and the third station STA3 by sending a broadcast trigger frame TR23 to the second station STA2 and the third station STA3.

The first DL data frame DLDATA1 is transmitted using an upper 20 MHz bandwidth 2004 of the DL MU transmission 2002. The broadcast trigger frame TR23 is transmitted using a lower 20 MHz bandwidth 2006 of the DL MU transmission 2002.

The scheduled resource for the second station STA2's UL transmission occupies bandwidth outside of 20 MHz channel that is occupied by the broadcast trigger frame TR23 but is still within the transmission bandwidth of preceding DL MU transmission 2002.

Specifically, an upper 5 MHz bandwidth 2012 of an upper 20 MHz bandwidth of an UL MU transmission 2010 is allocated to an UL response BA1 of the first station STA1, which is transmitted in response to trigger information included in the first DL data frame DLDATA1. A lower 15 MHz bandwidth 2014 of the upper 20 MHz bandwidth of the UL MU transmission 2010 is allocated to a UL data frame ULDATA2 of the second station STA2, which is a first data transmission performed in response to the broadcast trigger frame TR23. A lower 20 MHz bandwidth 2016 of the UL MU transmission 2010 is allocated to an UL data frame ULDATA3 of the third station STA3, which is a second data transmission performed in response to the broadcast trigger frame TR23.

Figure 21:
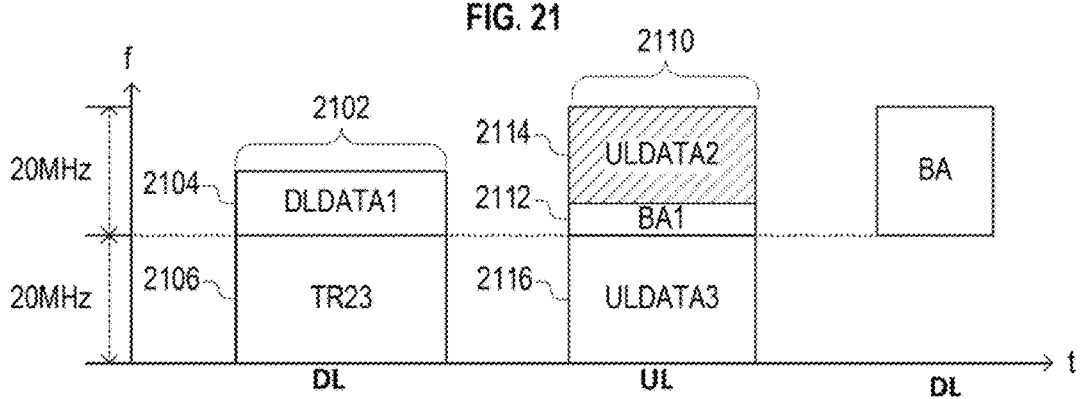
FIG. 21 illustrates another allocation according to an embodiment.

FIG. 21 illustrates another example of bandwidth allocation according to an embodiment. In FIG. 21, an AP transmits DL data frame DLDATA1 to a first station STA1 in a DL MU transmission 2102. The AP also schedules respective UL MU transmissions from a second station STA2 and a third station STA3, and this scheduling information is indicated to the second station STA2 and the third station STA3 by sending a broadcast trigger frame TR23 to the second station STA2 and the third station STA3.

The first DL data frame DLDATA1 is transmitted using a lower 10 MHz bandwidth 2104 of an upper 20 MHz bandwidth of the DL MU transmission 2102. The broadcast trigger frame TR23 is transmitted using a lower 20 MHz bandwidth 2106 of the DL MU transmission 2102.

The scheduled resource for the second station STA2's UL transmission occupies bandwidth outside of 20 MHz channel that is occupied by the broadcast trigger frame TR23 but is still within the 20 MHz channels used by the preceding DL MU transmission 2102. In addition, the transmission bandwidth (not including a preamble) of a UL MU transmission 2110 sent in response to the DL MU transmission 2102 is larger than the transmission bandwidth (not including a preamble) of the DL MU transmission 2102, but the UL MU transmission 2110 occupies the same 20 MHz channels occupied by the DL MU transmission 2102.

Specifically, an lower 5 MHz bandwidth 2112 of an upper 20 MHz bandwidth of an UL MU transmission 2110 is allocated to an UL response BA1 of the first station STA1, which is transmitted in response to trigger information included in the first DL data frame DLDATA1. An upper 15 MHz bandwidth 2114 of the upper 20 MHz bandwidth of the UL MU transmission 2110 is allocated to a UL data frame ULDATA2 of the second station STA2, which is a first data transmission performed in response to the broadcast trigger frame TR23. A lower 20 MHz bandwidth 2116 of the UL MU transmission 2110 is allocated to an UL data frame ULDATA3 of the third station STA3, which is a second data transmission performed in response to the broadcast trigger frame TR23.

Figure 22:
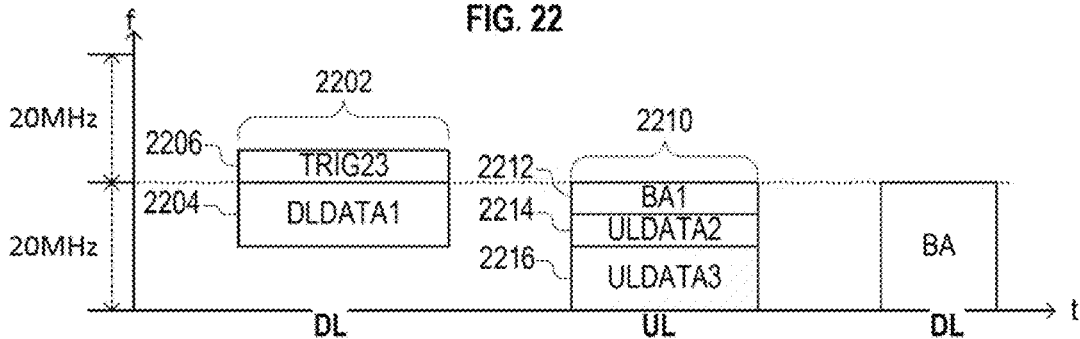
FIG. 22 illustrates another allocation according to an embodiment.

FIG. 22 illustrates another example of bandwidth allocation according to an embodiment. In FIG. 22, an AP transmits DL data frame DLDATA1 to a first station STA1 in a DL MU transmission 2202. The AP also schedules respective UL MU transmissions from the second station STA2 and the third station STA3, and this information is indicated to the second station STA2 and the third station STA3 by sending a broadcast trigger frame TR23 to the second station STA2 and the third station STA3.

The first DL data frame DLDATA1 is transmitted using an upper 10 MHz bandwidth 2204 of a lower 20 MHz bandwidth of the DL MU transmission 2202. The broadcast trigger frame TR23 is transmitted using a lower 5 MHz bandwidth 2206 of an upper 20 MHz bandwidth of the DL MU transmission 2202.

The scheduled resource for the second station STA2's UL transmission occupies bandwidth outside of the 20 MHz channel that the broadcast trigger frame TR23 was transmitted in but is still within the transmission bandwidth of preceding DL MU transmission 2202. The scheduled resource for the third station STA3's UL transmission also occupies bandwidth outside of the 20 MHz channel that the broadcast trigger frame TR23 was transmitted in. In addition, the transmission bandwidth of a UL MU transmission 2210 sent in response to the DL MU transmission 2202 is larger than the transmission bandwidth of the DL MU transmission 2202, but the UL MU transmission 2210 occupies a subset of the 20 MHz channels occupied by the DL MU transmission 2202.

Specifically, an upper 5 MHz bandwidth 2212 of the upper 10 MHz of 20 MHz bandwidth of an UL MU transmission 2210 is allocated to an UL response BA1 of the first station STA1, which is transmitted in response to trigger information included in the first DL data frame DLDATA1. A lower 5 MHz bandwidth 2214 of the upper 10 MHz of the 20 MHz bandwidth of the UL MU transmission 2210 is allocated to a UL data frame ULDATA2 of the second station STA2, which is a first data transmission performed in response to the broadcast trigger frame TR23. A lower 10 MHz bandwidth 2216 of the UL MU transmission 2210 is allocated to an UL data frame ULDATA3 of the third station STA3, which is a second data transmission performed in response to the broadcast trigger frame TR23. An upper 20 MHz bandwidth used by the DL MU transmission 2202 is not used by the UL MU transmission 2210, that is, the UL MU transmission 2210 is performed using only a 20 MHz channel.

Figure 23:
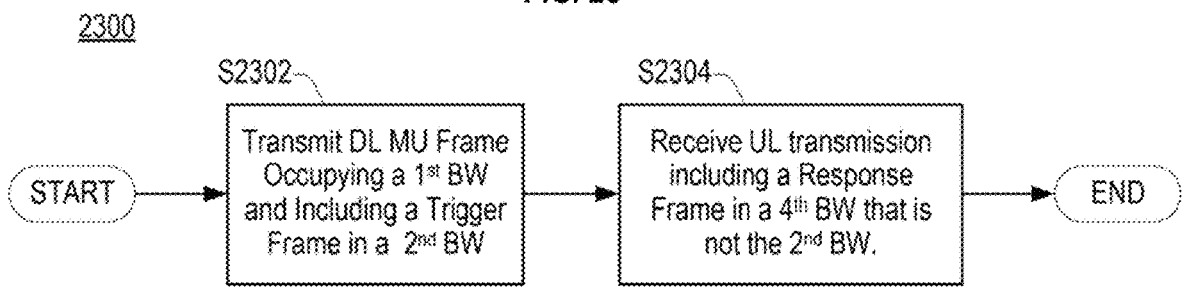
FIG. 23 illustrates a process for performing MU communications according to an embodiment.

FIG. 23 illustrates a process 2300 for performing MU communications according to an embodiment. The process 2300 may be performed by an Access Point (AP).

At S2302, the process 2300 transmits a DL MU transmission occupying a first bandwidth (BW). The DL MU transmission includes a first frame and a second frame. The first frame (for example, a trigger frame) is configured to solicit a first response frame from one or more stations as an immediate response. The first frame occupies a second bandwidth that is a subset of the first bandwidth.

At S2304, the process 2300 receives an UL transmission having a third bandwidth in a first predetermined time after transmitting the DL transmission. The third bandwidth is within one or more of the 20 MHz channels of the first bandwidth.

The UL transmission includes the first response frame. The first response frame occupies a fourth bandwidth within one or more 20 MHz channels of the first bandwidth occupied by the DL MU transmission. The fourth bandwidth is not the same and does not overlap with the second bandwidth.

In an embodiment, the fourth bandwidth is within a first 20 MHz channel that is the same second 20 MHz channel that includes the second bandwidth.

In an embodiment, the third bandwidth is a subset of the first bandwidth.

In an embodiment, the transmission bandwidth of a physical layer preamble part of the first response frame is a subset of the transmission bandwidth of a physical layer preamble part of the DL transmission.

In an embodiment, the predetermined time is SIFS.

In an embodiment, information regarding the third bandwidth is indicated in the first frame.

In an embodiment, the first frame and the second frame are allocated in different frequency resources.

Embodiments of the present disclosure enable an AP to more flexibly utilize transmission bandwidth for UL MU PPDUs, compared to the IEEE Std 802.11n and 802.11ac standards. As frequency resource can be flexibly adapted depending on channel status, amount of traffic, and so on, overall spectrum efficiency can be improved relative to the IEEE Std 802.11n and 802.11ac standards without additional signaling overhead.

In an embodiment of the present disclosure, when an AP sends a trigger frame that initiates random access and the AP does not receive any immediate response right after sending the trigger frame, a value of a contention window is left unchanged.

In another embodiment of the present disclosure, an AP shall not allocate an UL subchannel in any 20 MHz channel of an UL transmission that is not occupied by a trigger frame in the DL transmission that causes the UL transmission, and in each 20 MHz channel occupied by the trigger frame, there is at least one allocated subchannel in the UL transmission that is not for random access.

In another embodiment of the present disclosure, when an AP allocates resources for an UL MU transmission and indicates the allocation in a trigger frame, and if there exists any non-allocated resources for UL MU transmission, the AP can indicate a mode of operation that permits the non-allocated resources to be used for random access.

Figure 24:
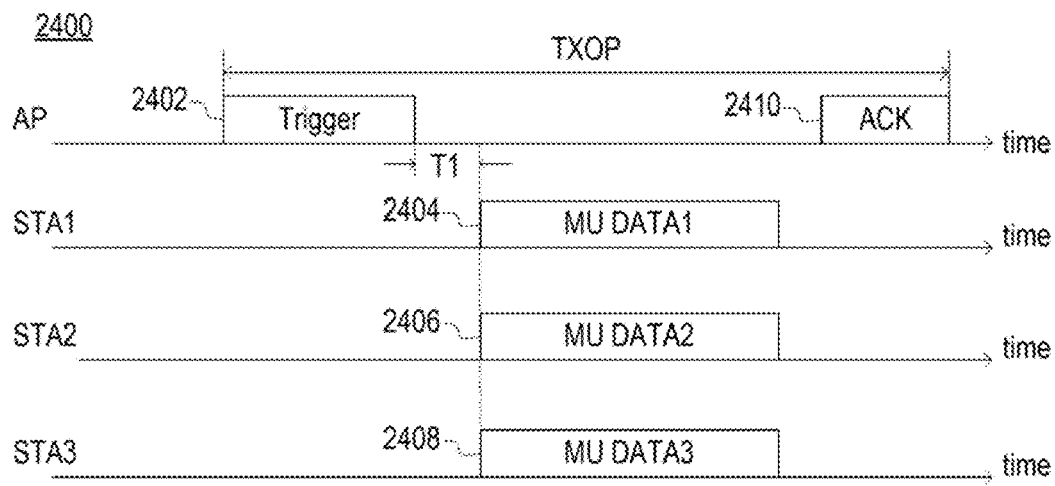
FIG. 24 illustrates an UL MU simultaneous transmission.

FIG. 24 illustrates a process 2400 for performing an Up-Link (UL) multi-user (MU) simultaneous transmission in a Transmission Opportunity (TXOP).

In the process 2400, an Access Point (AP) transmits a trigger frame 2402 as a timing reference. The AP sends the trigger frame 2402 as a multicast or broadcast transmission so that all of a plurality of target UL MU transmitters (here, first, second and third stations STA1, STA2, and STA3) can recognize the trigger frame 2402.

A predetermined time T1 after receiving the trigger frame, the target UL MU transmitters simultaneously send respective UL MU data frames as a response. The first station STA1 transmits a first UL MU data frame 2404, the second station STA2 transmits a second UL MU data frame 2406, and the third station STA3 transmits a third UL MU data frame 2408. In embodiments, the UL MU data frames 2404, 2406, and 2408 may be UL MU MIMO frames or UL MU OFDMA frames.

Because all the target UL MU transmitters (or stations) STA1, STA2, and STA3 received the trigger frame 2402 almost simultaneously and all the target UL MU transmitters STA1, STA2, and STA3 use the same delay of the predetermined time T1, the transmission time of all the target UL MU transmitters STA1, STA2, and STA3 can be synchronized, and thus, the AP can receive the UL MU data frames 2404, 2406, and 2408 sent by the target UL MU transmitters STA1, STA2, and STA3, respectively, in a synchronized manner.

After the AP correctly receives and decodes the UL MU data frames 2404, 2406, and 2408, the AP may send one or more acknowledgement frames 2410 to the target UL MU transmitters STA1, STA2, and STA3.

However, for the AP to determine proper scheduling or resource allocation for a UL MU simultaneous transmission, the AP needs to identify buffer status and related QoS information for each station that is a candidate for participation in the UL MU simultaneous transmission. If a station is already being served by the AP, this information can be piggybacked on ongoing UL data frames. However, in a number of UL MU operation scenarios, the AP may need to schedule a UL MU transmission from the time new packet bursts come to the station, in which case there may be no ongoing UL data frame onto which the buffer status and related QoS information can be piggybacked.

When there is no ongoing UL data frame from a station and the AP needs to identify the buffer status and related QoS information, the station may need to first send the buffer status and related QoS information to the AP. However, this buffer status and related QoS information may occupy a substantial amount of a wireless channel resource, imposing for the UL MU transmission, and thereby will decrease the performance gain obtained using the UL MU transmission.

Accordingly, an AP may schedule a random access channel, wherein more than one station can be allocated for UL MU transmission at a resource allocation unit.

Figure 25:
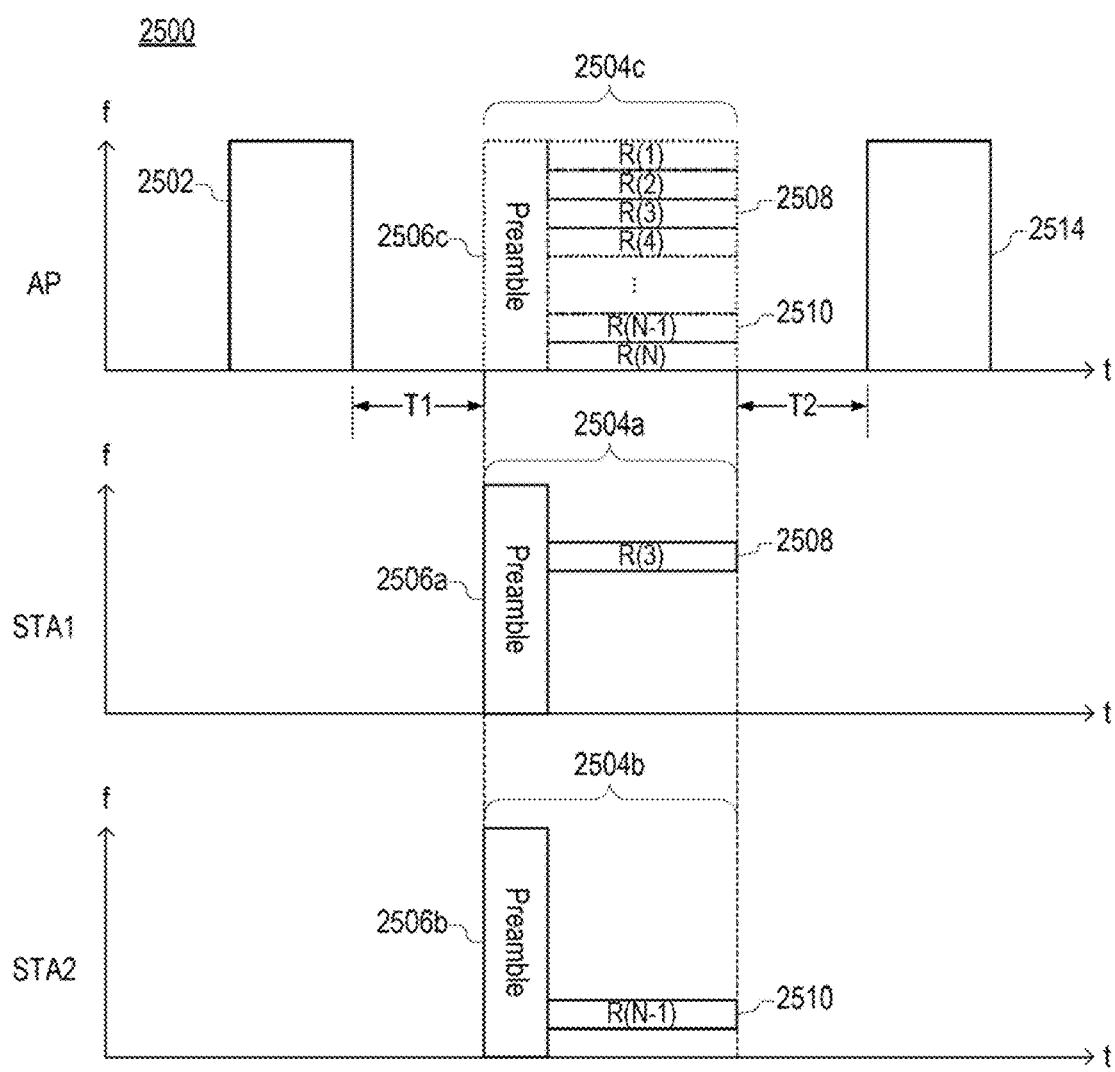
FIG. 25 illustrates an UL MU transmission including a random access channel according to an embodiment.

FIG. 25 illustrates a process 2500 for an UL MU transmission including a random access channel according to an embodiment.

As shown in this drawing, an AP sends a first frame 2502, such as the trigger frame that mentioned above, to a group of stations, wherein the first frame 2502 indicates a first information for the immediately following UL OFDMA frame 2504, and wherein the first information comprises at least the following information:

An allocated resource structure. FIG. 25 shows N allocated resources R(1) to R(N).

A mapping between stations and resource allocation units that is not 1-to-1, and thus allows more than one station within the group of stations to use a same resource for an UL MU transmission, at least for one or more resources. In this example, all the resources are allocated for this purpose, and no resources is allocated to a specific station.

A transmission length.

As a response to the first frame 2502, stations within the group of stations that have UL frames buffered send a UL OFDMA frame using one of scheduled resource units (R(1), R(2), . . . , R(N)) a predetermined time T1 after receiving the first frame 2502. The UL OFDMA frame may include a second information that helps the AP to schedule an UL MU transmission, such as information about UL frames that are buffered.

In FIG. 25, two stations (the first station STA1 and the second STA2) have buffered data for the UL transmission, and the first station STA1 chooses to use a first resource R(3) to send its buffered data or information about its buffered data, and the second station STA2 chooses to use a second resource R(N−1) to send its buffered data or information about its buffered data.

The first station STA1 transmits a first UL OFDMA frame 2504a including a first preamble 2506a and a first payload 2508. The first preamble 2506a uses an entire bandwidth allocated to the UL OFDMA transmission by the AP. The first payload 2508 uses only the bandwidth of the first resource R(3).

The second station STA2 transmits a second UL OFDMA frame 2504b including a second preamble 2506b and a second payload 2510. The second preamble 2506b uses an entire bandwidth allocated to the UL OFDMA transmission by the AP and is the same as the first preamble 2506a. The second payload 2510 uses only the bandwidth of the second resource R(N−1).

The UL OFDMA frames 2504a and 2504b, along with any UL OFDMA frames sent by other stations in response to the first frame 2502, air-combine in the wireless channel to create the received UL OFDMA frames 2504c. The received UL OFDMA frames 2504c includes a received preamble 2506c that is identical to the preamble 2506a and 2506b. the received UL OFDMA frames 2504c includes a received payload comprised of the payloads 2508 and 2510 and any other payloads sent by other stations in response to the first frame 2502, when stations sending payloads choose respective different resources to send the respective payloads.

As a response to the receiving the received UL OFDMA frame 2504c from one or more of the stations, the AP sends back an acknowledgement frame 2514 a second predetermined time T2 after receiving the received UL OFDMA frame 2504c.

In another embodiment, an AP may send a trigger frame for random access such that there is no specific target receiver for the trigger frame. In response to the trigger frame, any station that meets the requirements for the random access channel will send a UL MU PPDU as an immediate response (after a predetermined time) to the trigger frame. The AP may check every allocated resource of the random access channel to determine whether any station has sent an UL MU PPDU in response to the trigger frame.

Because there is no specific station allocated for immediate response to the trigger frame, it is possible that no station will respond to the trigger frame, such as when no station has buffered UL data to transmit. This may occur even when every station received the trigger frame correctly. As a result, according to the definitions of a transmission failure in the IEEE 802.11n and 802.11ac standards, the transmission of the trigger frame will be determined to have failed due to the AP not receiving a required immediate response to the transmission of the trigger frame. When this occurs, the IEEE 802.11n and 802.11ac standards require a contention window to be extended, which reduces the AP's chance of accessing the wireless medium.

Embodiments of the present disclosure include apparatus and processes that overcome these problems.

In an embodiment, when an AP sends a trigger frame that initiates random access and the AP does not receive an immediate response within a predetermined time after sending the trigger frame, the value of the contention window is left unchanged.

In the embodiment, a backoff procedure shall be invoked by an Enhanced Distributed Channel Access Function (EDCAF) when any of the following events occurs:

a) An MA-UNITDATA.request primitive is received that causes a frame with that Access Category (AC) to be queued for transmission such that one of the transmit queues associated with that AC has now become non-empty and any other transmit queues associated with that AC are empty, the medium is busy on the primary channel as indicated by either physical or virtual CS, and the backoff timer has a value of 0 for that AC.

b) The transmission of the MPDU in the final PPDU transmitted by the transmission Opportunity (TXOP) holder during the TXOP for that AC has completed and the TXNAV timer has expired, and the AC was a primary AC. (See 10.22.2.2 of IEEE P802.11-REVmc/D5.2 (EDCA backoff procedure)).

c) The expected immediate response to the initial frame of a TXOP of that AC is not received and the AC was a primary AC and the initial frame is not a trigger frame that initiates random access (that is, the initial frame is not a trigger frame that has no resource scheduled to a specific station, or to put it another way, the initial frame is either not a trigger frame or is a trigger frame that includes a scheduling of a resource to a specific station.)

d) The transmission attempt collides internally with another EDCAF of an AC that has higher priority, that is, two or more EDCAFs in the same station are granted a TXOP at the same time.

e) The expected immediate response to the initial frame that initiates random access (with no resource scheduled to specific station) of a TXOP is not received.

When the backoff procedure is invoked for either of reasons a) and e) above, the value of a Contention Window of the AC (CW[AC]) shall be left unchanged.

When the backoff procedure is invoked because of reason b) above, the value of CW(AC) shall be reset to a predetermined minimum value of the Contention Window for the AC (CWmin[AC]).

When the backoff procedure is invoked because of a failure event or the transmission failure of a non-initial frame by the TXOP holder (that is, either of reason c or d above), the value of CW[AC] shall be updated as follows before invoking the backoff procedure:

When a QoS short retry counter for the AC (QSRC[AC]) or a QoS long retry counter for the AC (QLRC[AC]) has reached dot11ShortRetryLimit or dot11LongRetryLimit, respectively, CW[AC] shall be reset to CWmin[AC].

When a dot11RobustAVStreamingImplemented parameter is true and either the QSDRC[AC] or the QLDRC[AC] has reached dot11ShortDEIRetryLimit or dot11LongDEIRetryLimit, respectively, CW[AC] shall be reset to CWmin[AC].

Otherwise, when CW[AC] is less than a predetermined maximum value of the Contention Window for the AC (CWmax[AC]), CW[AC] shall be set to the value (CW[AC]+1)×2−1, and when CW[AC] is equal to CWmax[AC], CW[AC] shall be left unchanged.

The following drawings shows example scenarios for the proposed embodiment.

FIG. 26A illustrates an AP initiating a TXOP by sending a data frame 2602 according to an embodiment. A first station STA1 is the target receiver of the data frame 2602.

When the first station STA1 does not send an ACK frame in a predetermined time T1, the AP determines that a transmission failure of the data frame 2602 has occurred, and as a result the AP shall invoke backoff. When a CW(AC) of the AC of the data frame 2602 has not reached the CWmax(AC), the AP may extend the CW(AC) such that new CW[AC] equals to (CW[AC]+1)×2−1.

FIG. 26B illustrates an AP initiating a TXOP by sending a trigger frame 2604 which initiates random access and does not include any resource scheduled to specific stations, according to an embodiment. In this example, there are three stations (stations STA1, STA2, and STA3) that successfully receive the trigger frame correctly. However, in the example, none of the stations STA1, STA2, and STA3 have UL buffered data frame to send, and as a result none of the stations STA1, STA2, and STA3 send back any frame using a resource allocated to random access.

When the AP does not receive any frame that is an immediate response to the trigger Frame 2604 within the predetermined time T1 after sending the trigger frame 2604, then because the frame that initiated the TXOP was a trigger frame for random access that does not include any resource scheduled to specific one or more stations, the AP shall invoke a backoff using an unchanged CW[AC].

In an embodiment of the present disclosure, if a first station sends a first frame that initiates a TXOP, wherein the target receiver of the first frame is not uniquely specified, and the first station does not receive any immediate response in a predetermined time after sending the first frame, the station invokes a backoff procedure, wherein the value of the contention window is left unchanged from the previous contention window.

The predetermined time may be a SIFS time defined in an IEEE 802.11 standard.

The first frame may include an indication that all participating station shall use a predetermined MCS level.

In an embodiment, the Receiver Address (RA) field of the first frame may be a broadcast address and the first frame may include resource allocation information indicating that more than one stations can use an allocated resource to participate in an immediate response.

In an embodiment, more than one stations can participate using any or all of the allocated resources.

In another embodiment, an AP shall not allocate a UL subchannel in any 20 MHz channel of an UL transmission that is not occupied by a corresponding trigger frame, and in each 20 MHz channel occupied by a respective trigger frame, there is at least one allocated subchannel that is not for random access.

In another embodiment, an AP shall not allocate a UL subchannel in any 20 MHz channel of an UL transmission that is not occupied by a corresponding trigger frame, and in each 20 MHz channel occupied by a respective trigger frame, there is at least one allocated subchannel that is not for random access when the AP allocates at least one UL subchannel that is not for random access in any 20 MHz channel that is occupied by the trigger frame, that is, for any 20 MHz channel that is occupied by a trigger frame, unless all of the UL subchannels of the 20 MHz channel are allocated to random access, at least one UL subchannel of the 20 MHz channel is allocated to a purpose other than random access.

FIG. 27 illustrates an operation 2700 of an UL MU transmission including random access channels according to an embodiment. In FIG. 27, a trigger frame 2702 directs a set of stations, including first and second stations STA1 and STA2, to transmit UL MU PPDUs as an immediate response to the trigger frame 2702. The transmitted UL MU PPDUs comprise a UL MU transmission 2710.

The trigger frame 2702 includes information regarding the allocated resources (for example, subchannels) for the stations to use in the UL MU transmission 2710. One or more of the resources are random access resources allocated to stations that are not uniquely specified, that is, a plurality of stations are all allocated at least one same random access resource for use in the UL MU transmission 2710.

The information in the trigger frame 2702 allocates resources in an upper part 2716 of a primary 20 MHz channels and an resources in upper part 2712 of a secondary 20 MHz channels for random access. As a result, any station receiving the trigger frame 2702 may send UL MU frames to the AP using one or more of the resources allocated for random access.

The information in the trigger frame 2702 allocates lower parts of the primary and secondary 20 MHz channels to unique stations: the lower part 2718 of the primary 20 MHz channel is allocated to a first station STA1, and the lower part 2714 of the secondary 20 MHz channel is allocated to the second station STA2. As a result, each of the 20 MHz channels occupied by the trigger frame 2702 has at least one target station directed to send, as a response to the AP's transmission of the trigger frame 2702, an immediate response frame using the 20 MHz channel.

This channel allocation performed by the information in the trigger frame 2702 allows UL MU transmission in a random access fashion. Therefore, as long as the target stations that are uniquely allocated resources (here, the first and second stations STA1 and STA2) receive and respond to the trigger frame 2702 correctly, an immediate response frame will occupy each of the 20 MHz channels used by the operation 2700 for the duration of the UL MU transmission 2710, which prevents a third-party station from acquiring access to the wireless medium during the duration of the UL MU transmission 2710.

In an embodiment, a first station sends a first frame occupying a first transmission bandwidth. The first frame indicates that more than one stations are allowed to transmit frames as immediate responses occupying different resources, as part of an UL MU transmission. All of the allocated resources are within the first transmission bandwidth. At least one resource in the primary 20 MHz channel is allocated to a second station and to no other station.

In an embodiment, only one station may be uniquely allocated for a first part of resources in the primary 20 MHz channel, and more than one stations may be allowed to participate in the UL MU transmission using a second part of resources in the primary 20 MHz channel.

In an embodiment, the first frame further indicates that any station that satisfies a first condition can participate in the UL MU transmission using the second part of resources in the primary 20 MHz channel.

In an embodiment, the second part of resources in the primary 20 MHz channel is allocated for random access.

In an embodiment, no station is allocated in the second part of resources in the primary 20 MHz channel.

In an embodiment, different resources are allocated in an OFDMA manner.

In an embodiment, different resources are allocated in a MU-MIMO manner.

In an embodiment, different resources are allocated in a combination of an OFDMA and a MU-MIMO manner.

In another embodiment, the first frame further indicates that in every 20 MHz channel within the first transmission bandwidth, a respective station is uniquely allocated at least one resource of the 20 MHz channel.

In an embodiment, only one station is uniquely allocated for the first part of resources in every 20 MHz channel within the first transmission bandwidth, and more than one stations are allowed to participate in the second part of resources in every 20 MHz channel within the first transmission bandwidth.

In an embodiment, no station is allocated in the second part of resources in every 20 MHz channel within the first transmission bandwidth.

In an embodiment, a first part of resources in a first 20 MHz channel within the first transmission bandwidth is different from a first part of resources in a second 20 MHz channel within the first transmission bandwidth.

In an embodiment, a second part of resources in a first 20 MHz channel within the first transmission bandwidth is different from a second part of resources in a second 20 MHz channel within the first transmission bandwidth.

In another embodiment of the present disclosure, when an AP allocates resources for a UL MU transmission and indicates the allocation in a trigger frame, and there exists one or more non-allocated resources for the UL MU transmission, the AP can indicate a mode of operation wherein the left-over (that is, non-allocated) resources can be used for random access. In an embodiment, the group of resources may include resources allocated for use for random access.

FIG. 28 illustrates an allocation of building blocks in a frame wherein unallocated resources may be used for random access, according to an embodiment.

FIG. 28 illustrates a plurality of building blocks, that is, resources that can be individually allocated, of a 40 MHz transmission according to an embodiment. The building blocks may be building blocks defined in an IEEE 802.11ax specification framework document.

The bandwidth of each building blocks can be different. For example, building blocks R1$a$-R1$r$ have respective 2 MHz bandwidths, building blocks R2$a$-R2$h$ have respective 4 MHz bandwidths, building blocks R3$a$-R3$d$ have respective 8 MHz bandwidths, building blocks R4$a$ and R4$b$ have respective 20 MHz bandwidths, and single user allocation building block R5$a$ occupies an entire transmission bandwidth.

Although FIG. 28 indicates specific numbers and bandwidths for the building blocks, embodiments are not limited thereto.

When a building block is allocated, other building blocks that share one or more resources of the allocated building block cannot be allocated. For example, if building block R2$g$ is allocated to a station, then building blocks R1$o$, R1$p$, R3$d$, R4$b$, and R5$a$ cannot be allocated to a station or to random access.

An AP can select resource allocations for an OFDMA transmission that are combinations of different building blocks. In this example, an AP allocates resources to a first station STA1 and a second station STA2 for an UL MU OFDMA transmission. The first station STA1 is allocated resources of the building block R3$a$ having an 8 MHz bandwidth, and the second station STA2 is allocated resources of the building block R2$g$ having a 4 MHz bandwidth.

In the embodiment, an AP includes in a trigger frame only resource allocation information for first resources to which only one respective station is uniquely assigned. Therefore, for the allocation shown in FIG. 28, the trigger frame comprises information allocating the resources in the building blocks R3$a$ and R2$g$. For these resources, the trigger frame further includes an indication of the respective assigned stations.

In addition, the AP may include in the trigger frame an indication that non-allocated resources can be used for random access. When this indication is included, each station receiving the trigger frame can participate the UL MU OFDMA transmission using one or more of resources that are not in the first resources, assuming a predetermined bandwidth for the one or more resources.

In this example, the predetermined bandwidth for the resource may be a minimum bandwidth of available building blocks (here, for example, 2 MHz). Therefore, excluding the first resources, other resources (R1$e$-R1$n$, R1$q$, and R1$r$) can be used by any station receiving the trigger frame to participate in a random access upload as part of the UL MU OFDMA transmission. Participating stations may use a predetermined MCS level and a predetermined number of spatial streams (N_STS), and as a result the trigger frame does not need to include detailed information for the resources that are available for random access.

In an embodiment, an AP shall not allocate UL subchannel in any 20 MHz channel that is not occupied by the trigger frame, and in each 20 MHz channel occupied by the trigger frame, there is at least one allocated subchannel for UL transmission, and non-allocated subchannels can be used for random access.

In an embodiment, an AP sends a first frame, wherein the first frame comprises information on a first group of resources of a UL MU OFDMA transmission. The resources in the first group of resources are allocated to respective stations, and no resource in the first group of resources is allocated to more than one station. The first frame includes an indication that stations that satisfy a first condition are allowed to participate in the UL MU OFDMA transmission using any of resources within a second group of resources. The AP receives UL frames as part of an UL MU OFDMA from one or more stations in a predetermined time from the end of the transmission of the first frame.

In an embodiment, the first group of resources and the second group of resources are within the transmission bandwidth of the first frame.

In an embodiment, no resources belong to both the first group of resources and the second group of resources simultaneously.

In an embodiment, the allocated bandwidth of the resources within the second group of resources is the minimum bandwidth that can be allocated.

In an embodiment, resources within the second group of resources use a Discrete Fourier Transform (DFT) period of 12.8 µs and a subcarrier spacing of 78.125 kHz, and uses 26 tones with 2 pilots (24 data tones).

In an embodiment, stations transmitting using one or more resources of the second group of resources use a predetermined Modulation and Coding Scheme (MCS) level and number of streams. The predetermined MCS may be Binary Phase Shift Keying (BPSK) modulation with code rate of ½. The predetermined number of streams may be 1.

In an embodiment, each 20 MHz channel occupied by the first frame includes at least one resource that is within the first group of resources.

In an embodiment, the predetermined time is a SIFS defined in an IEEE 802.11 standard.

In an embodiment, the predetermined time is longer than a SIFS and shorter than a PIFS defined in an IEEE 802.11 standard.

In an embodiment, the predetermined time is a PIFS defined in an IEEE 802.11 standard.

In an embodiment, the first frame further comprises a first information corresponding to identification of the assigned stations to the resources that are within the first group of stations. The first information may include at least part of association IDs (AIDs) of the respective assigned stations.

Embodiments of the present disclosure enable an AP to maintain a reasonable contention window even when no stations send back UL frames using random access. Embodiments prevent third party stations from interfering with a TXOP of a station when no stations send back UL frames using random access. Embodiments reduce overhead in a trigger frame that initiates an UL MU transmission when the trigger frame is used by an AP to schedule both random access and scheduled access.

The solutions provided herein have been described with reference to a wireless LAN system; however, it should be understood that these solutions are also applicable to other network environments, such as cellular telecommunication networks, wired networks, etc.

The above explanation and figures are applied to an HE station, an HE frame, an HE PPDU, an HE-SIG field and the like of the IEEE 802.11ax amendment, but they can also applied to a receiver, a frame, PPDU, a SIG field, and the like of the next amendment of IEEE 802.11. Furthermore, some embodiments have been described with respect to a secondary channel, but embodiments are not limited thereto.

Embodiments of the present disclosure include electronic devices configured to perform one or more of the operations described herein. However, embodiments are not limited thereto.

Embodiments of the present disclosure may further include systems configured to operate using the processes described herein. The systems may include basic service sets (BSSs) such as the BSSs 100 of FIG. 1, but embodiments are not limited thereto.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 1.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

In some cases, an embodiment of the invention may be an apparatus (e.g., an AP station, a non-AP station, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method implemented by an Access Point (AP) in a wireless communication system, the method comprising:
  transmitting a first Down Link (DL) Physical Protocol Data Unit (PPDU), including a plurality of trigger information, the plurality of trigger information including first trigger information initiating a first frame exchange and second trigger information initiating a second frame exchange;
  successfully receiving an Up Link (UL) PPDU;
  determining whether the UL PPDU includes a Medium Access Control (MAC) Data Protocol Unit (MPDU)

from at least one station solicited by the first trigger information of the plurality of trigger information; and in response to determining that the UL PPDU includes an MPDU from the at least one station solicited by the first trigger information, determining that the first and second frame exchanges are both successful.

2. The method of claim 1, further comprising:
in response to determining that the UL PPDU does not include an MPDU from any station solicited by the plurality of trigger information, performing a backoff procedure.

3. The method of claim 1,
wherein the first trigger information is included in a first MPDU header of the first DL PPDU or a first MPDU payload of the first DL PPDU;
wherein the second trigger information is included in a second MPDU header of the first DL PPDU or a second MPDU payload in the first DL PPDU; and
wherein the first trigger information is included in a different MPDU header or MPDU payload than the MPDU header or MPDU payload that includes the second trigger information.

4. The method of claim 1, further comprising:
in response to determining that the UL PPDU includes the MPDU from the at least one station solicited by the first trigger information:
determining whether the UL PPDU includes an MPDU from a station solicited by the second trigger information; and
in response to determining that the UL PPDU does not include an MPDU from a station solicited by the second trigger information, transmitting a second DL PPDU including the second trigger information.

5. The method of claim 4, wherein transmitting the second DL PPDU includes transmitting the second DL PPDU only when a remaining duration of a Transmission Opportunity, including the first DL PPDU, is greater than or equal to a duration of the second DL PPDU plus a duration of an expected response to the second DL PPDU plus a duration of an inter-frame space between the second DL PPDU and the expected response.

6. The method of claim 1, wherein successfully receiving the UL PPDU includes receiving the UL PPDU as an immediate response to the first DL PPDU, the reception of the UL PPDU beginning during a predetermined timeout interval after completion of the transmission of the first DL PPDU.

7. The method of claim 1, wherein the determining that the first frame exchange and the second frame exchange are successful is irrespective of successful receipt of an UL PPDU from at least one station solicited by the second trigger information.

8. An apparatus comprising:
a processor;
a transmitter; and
a receiver,
wherein the processor is configured to perform:
generating a first Down Link (DL) Physical Protocol Data Unit (PPDU) including a plurality of trigger information, the plurality of trigger information including first trigger information initiating a first frame exchange and second trigger information initiating a second frame exchange;
transmitting, using the transmitter, the first DL PPDU;
successfully receiving, using the receiver, an Up Link (UL) PPDU;
determining whether the UL PPDU includes a Medium Access Control (MAC) Data Protocol Unit (MPDU) from at least one station solicited by the first trigger information of the plurality of trigger information; and
in response to determining that the UL PPDU includes an MPDU from the at least one station solicited by the first trigger information, determining that the first and second frame exchanges are both successful.

9. The apparatus of claim 8, wherein the processor is further configured to perform:
in response to determining that the UL PPDU does not include an MPDU from any station solicited by the plurality of trigger information, performing a backoff procedure.

10. The apparatus of claim 8,
wherein the first trigger information is included in a first MPDU header of the first DL PPDU or a first MPDU payload of the first DL PPDU;
wherein the second trigger information is included in a second MPDU header of the first DL PPDU or a second MPDU payload in the first DL PPDU; and
wherein the first trigger information is included in a different MPDU header or MPDU payload than the MPDU header or MPDU payload that includes the second trigger information.

11. The apparatus of claim 8, further comprising:
in response to determining that the UL PPDU includes the MPDU from the at least one station solicited by the first trigger information:
determining whether the UL PPDU includes an MPDU from a station solicited by the second trigger information; and
in response to determining that the UL PPDU does not include an MPDU from a station solicited by the second trigger information, transmitting a second DL PPDU including the second trigger information.

12. The apparatus of claim 11, wherein transmitting the second DL PPDU includes transmitting the second DL PPDU only when a remaining duration of a Transmission Opportunity, including the first DL PPDU, is greater than or equal to a duration of the second DL PPDU plus a duration of an expected response to the second DL PPDU plus a duration of an inter-frame space between the second DL PPDU and the expected response.

13. The apparatus of claim 8, wherein successfully receiving the UL PPDU includes receiving the UL PPDU as an immediate response to the DL PPDU, the reception UL PPDU beginning during a predetermined timeout interval after completion of the transmission of the first DL PPDU.

14. The apparatus of claim 8, wherein the determining that the first frame exchange and the second frame exchange are successful is irrespective of successful receipt of an UL PPDU from at least one station solicited by the second trigger information.

15. A non-transitory computer-readable media comprising computer programming instructions that when executed by an apparatus, including a processor, cause the apparatus to:
transmit a first Down Link (DL) Physical Protocol Data Unit (PPDU) including a plurality of trigger information, the plurality of trigger information including a first trigger information initiating a first frame exchange and a second trigger information initiating a second frame exchange;
detect the successful reception of an Up Link (UL) PPDU;
determine whether the UL PPDU includes a Medium Access Control (MAC) Data Protocol Unit (MPDU)

from at least one station solicited by the first trigger information of the plurality of trigger information; and in response to determining that the UL PPDU includes an MPDU from the at least one station solicited by the first trigger information, determine that the first and second frame exchanges are both successful.

16. The non-transitory computer-readable media of claim 15, wherein the computer programming instructions further cause the apparatus to:
in response to determining that the UL PPDU does not include an MPDU from any station solicited by the plurality of trigger information, perform a backoff procedure.

17. The non-transitory computer-readable media of claim 15,
wherein the first trigger information is included in a first MPDU header of the first DL PPDU or a first MPDU payload of the first DL PPDU;
wherein the second trigger information is included in a second MPDU header of the first DL PPDU or a second MPDU payload in the first DL PPDU; and
wherein the first trigger information is included in a different MPDU header or MPDU payload than the MPDU header or MPDU payload that includes the second trigger information.

18. The non-transitory computer-readable media of claim 15, wherein the computer programming instructions further cause the apparatus to:
in response to determining that the UL PPDU includes the MPDU from the at least one station solicited by the first trigger information:
determine whether the UL PPDU includes an MPDU from a station solicited by the second trigger information; and
in response to determining that the UL PPDU does not include an MPDU from a station solicited by the second trigger information, transmit a second DL PPDU including the second trigger information.

19. The non-transitory computer-readable media of claim 18, wherein transmitting the second DL PPDU includes transmitting the second DL PPDU only when a remaining duration of a Transmission Opportunity, including the first DL PPDU, is greater than or equal to a duration of the second DL PPDU plus a duration of an expected response to the second DL PPDU plus a duration of an inter-frame space between the second DL PPDU and the expected response.

20. The non-transitory computer-readable media of claim 15, wherein the apparatus determines that the first frame exchange and the second frame exchange are successful irrespective of successful receipt of an UL PPDU from at least one station solicited by the second trigger information.

* * * * *